(12) United States Patent
Takai et al.

(10) Patent No.: US 11,362,605 B2
(45) Date of Patent: Jun. 14, 2022

(54) DRIVE METHODS FOR A THREE-PHASE MOTOR

(71) Applicant: SEMICONDUCTOR COMPONENTS INDUSTRIES, LLC, Phoenix, AZ (US)

(72) Inventors: Kazumasa Takai, Kakamigahara (JP); Fumio Kumazawa, Ota (JP); Masaki Yamashita, Higashi Niiza (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 56 days.

(21) Appl. No.: 16/775,527

(22) Filed: Jan. 29, 2020

(65) Prior Publication Data
US 2021/0234484 A1 Jul. 29, 2021

(51) Int. Cl.
*H02P 6/00* (2016.01)
*H02P 6/16* (2016.01)
*H02P 6/182* (2016.01)

(52) U.S. Cl.
CPC .................. *H02P 6/182* (2013.01)

(58) Field of Classification Search
CPC ...................................... H02P 6/182
USPC .................................. 318/400.35
See application file for complete search history.

(56) References Cited

U.S. PATENT DOCUMENTS

| | | | |
|---|---|---|---|
| 7,138,776 B1* | 11/2006 | Gauthier | H02P 6/182 318/400.34 |
| 8,188,697 B2* | 5/2012 | Miyagoe | H02P 25/03 318/400.35 |
| 2004/0263104 A1 | 12/2004 | Iwanaga et al. | |
| 2006/0028161 A1 | 2/2006 | Yamamoto et al. | |
| 2009/0289588 A1* | 11/2009 | Miyagoe | H02P 25/03 318/473 |
| 2014/0265964 A1* | 9/2014 | Yersin | H02P 6/182 318/400.26 |
| 2015/0042251 A1* | 2/2015 | Suzuki | H02P 6/20 318/400.11 |

FOREIGN PATENT DOCUMENTS

| | | |
|---|---|---|
| JP | 200642511 A | 2/2006 |
| WO | 2014035658 A2 | 3/2014 |

* cited by examiner

*Primary Examiner* — Erick D Glass
(74) *Attorney, Agent, or Firm* — Adam R. Stephenson, Ltd.

(57) ABSTRACT

A method of driving a three-phase motor includes, while a first phase is energized, driving a second phase using a first drive function which is sinusoidal. The first phase is switched to a non-energized state and a back electromotive force (BEMF) voltage of the first phase is detected. For at least a portion of a time when the first phase is non-energized the driving of the second phase depends on the output of a second drive function different from the first drive function. The second drive function may be non-sinusoidal and may be a cosine function. The second drive function may drive the second phase when the output of the second drive function is a modulation ratio less than 1. When the output of the second drive function is a modulation ratio greater than or equal to 1 the second phase may be driven to a modulation ratio of 1.

7 Claims, 27 Drawing Sheets

DRIVE METHODS FOR A THREE-PHASE MOTOR

BACKGROUND

1. Technical Field

Aspects of this document relate generally to methods of controlling three-phase motors. Specific aspects of this document relate to methods of controlling star-connected three-phase sensor-less motors.

2. Background

Three-phase motors use electricity applied to the motor in three different phases to rotate the motor. The phases ordinarily involve separate electrical connections and are commonly referred to as the U phase, V phase, and W phase.

SUMMARY

Implementations of methods of driving a star-connected three-phase motor may include: while a first phase of the star-connected three-phase motor is in an energized state, driving a second phase of the three-phase motor using a first sinusoidal drive function; and switching the first phase to a non-energized state. The method may also include while the first phase is in the non-energized state, detecting a first back electromotive force (BEMF) voltage of the first phase; and for at least a portion of a time when the first phase is in the non-energized state, driving the second phase using a second drive function that varies from the first sinusoidal drive function.

Implementations of methods of driving a star-connected three-phase motor may include one, all, or any of the following:

The three-phase motor may be a sensorless brushless direct current (BLDC) motor or a permanent magnet synchronous motor (PMSM).

The method may include where driving the second phase using the second drive function may result in an increased voltage applied to the second phase relative to driving the second phase using the first sinusoidal drive function.

The method may include where while the first phase is in a second non-energized state, a third phase of the three-phase motor may be driven using a third drive function that varies from a second sinusoidal drive function.

The method may include where driving the third phase using the third drive function may result in an increased voltage applied to the third phase relative to driving the third phase using the second sinusoidal drive function.

The method may include where after driving the second phase using the second drive function until the first BEMF voltage is detected, the second phase may be driven using the first sinusoidal drive function.

The method may include where after driving the second phase using the second drive function for a predetermined amount of time, the second phase may be driven using the first sinusoidal drive function.

In implementations of the method, a graph plotting a generated torque of the three-phase motor on a y-axis and a rotor angle position of a rotor of the three-phase motor on an x-axis may display no variation in the generated torque over at least one powered 360-degree rotation of the rotor.

Implementations of methods of driving a star-connected three-phase motor may include: driving a first phase of the star-connected three-phase motor using a first sinusoidal drive function when all three phases are energized; driving the first phase using a first non-sinusoidal drive function for at least a portion of a time when one phase other than the first phase is not energized and when the first non-sinusoidal drive function results in a modulation ratio less than 1. The method may include driving the first phase to a modulation ratio of 1 for at least a portion of a time when one phase other than the first phase is not energized and when the first non-sinusoidal drive function results in a modulation ratio greater than or equal to 1.

Implementations of methods of driving a star-connected three-phase motor may include one, all, or any of the following:

The modulation ratios may be low torque ripple modulation ratios.

The first non-sinusoidal drive function may be a first cosine drive function.

The first cosine drive function may be $$\left| \frac{M}{\cos(\theta - \theta_{wc})} \right|,$$

wherein M is a modulation ratio ranging from 0 to 1, wherein $\theta$ is an angle of rotation of the three-phase motor, and wherein $\theta_{wc}$ has a value of 0 degrees when $\theta$ is less than 30 degrees and greater than or equal to 0 degrees, a value of 60 degrees when $\theta$ is less than 90 degrees and greater than or equal to 30 degrees, a value of 120 degrees when $\theta$ is less than 150 degrees and greater than or equal to 90 degrees, a value of 180 degrees when $\theta$ is less than 210 degrees and greater than or equal to 150 degrees, a value of 240 degrees when $\theta$ is less than 270 degrees and greater than or equal to 210 degrees, a value of 300 degrees when $\theta$ is less than 330 degrees and greater than or equal to 270 degrees, and a value of 0 degrees when $\theta$ is less than 360 degrees and greater than or equal to 330 degrees.

The first sinusoidal drive function may be $$U_{2pm} = \frac{2}{\sqrt{3}} M * \{U_{3pm} - \min(U_{3pm}, V_{3pm}, W_{3pm})\},$$

wherein $$U_{3pm} = \frac{1}{2}\sin\theta, \; V_{3pm} = \frac{1}{2}\sin\left(\theta - \frac{2}{3}\pi\right),$$

$$W_{3pm} = \frac{1}{2}\sin\left(\theta - \frac{4}{3}\pi\right),$$

wherein M is a modulation ratio ranging from 0 to 1, and wherein $\theta$ is an angle of rotation of the three-phase motor.

Implementations of the method may include where a second phase of the three-phase motor may be driven using a second sinusoidal drive function when all three phases are energized; the second phase may be driven using the first non-sinusoidal drive function for at least a portion of a time when one phase other than the second phase is not energized and when the first non-sinusoidal drive function results in a modulation ratio less than 1; and the second phase may be driven to a modulation ratio of 1 for at least a portion of a time when one phase other than the second phase is not energized and when the first non-sinusoidal drive function results in a modulation ratio greater than or equal to 1.

The second sinusoidal drive function may be $$V_{2pm} = \frac{2}{\sqrt{3}} M * \{V_{3pm} - \min(U_{3pm}, V_{3pm}, W_{3pm})\},$$

wherein $$U_{3pm} = \frac{1}{2}\sin\theta, \ V_{3pm} = \frac{1}{2}\sin\left(\theta - \frac{2}{3}\pi\right),$$

$$W_{3pm} = \frac{1}{2}\sin\left(\theta - \frac{4}{3}\pi\right),$$

wherein M is a modulation ratio ranging from 0 to 1, and wherein θ is an angle of rotation of the three-phase motor.

Implementations of the method may include where a third phase of the three-phase motor may be driven using a third sinusoidal drive function when all three phases are energized; the third phase may be driven using the first non-sinusoidal drive function for at least a portion of a time when one phase other than the third phase is not energized and when the first non-sinusoidal drive function results in a modulation ratio less than 1; and the third phase may be driven to a modulation ratio of 1 for at least a portion of a time when one phase other than the third phase is not energized and when the first non-sinusoidal drive function results in a modulation ratio greater than or equal to 1.

The third sinusoidal drive function may be $$W_{2pm} = \frac{2}{\sqrt{3}} M * \{W_{3pm} - \min(U_{3pm}, V_{3pm}, W_{3pm})\},$$

wherein $U_{3pm} = \frac{1}{2}\sin\theta, \ V_{3pm} = \frac{1}{2}\sin\left(\theta - \frac{2}{3}\pi\right),$ $$W_{3pm} = \frac{1}{2}\sin\left(\theta - \frac{4}{3}\pi\right),$$

wherein M is a modulation ratio ranging from 0 to 1, and wherein θ is an angle of rotation of the three-phase motor.

Implementations of methods of driving a three-phase motor may include: driving a U phase of the three-phase motor using a first sinusoidal drive function when all three phases are energized; driving a V phase of the three-phase motor using a second sinusoidal drive function when all three phases are energized; driving a W phase of the three-phase motor using a third sinusoidal drive function when all three phases are energized; and driving each phase using a cosine drive function for at least a portion of a time when one other phase is not energized.

Implementations of methods of driving a three-phase motor may include one, all, or any of the following:

The modulation ratios may be low torque ripple modulation ratios.

In various implementations of the method, each phase may be driven using the cosine drive function for at least a portion of a time when one other phase is not energized and when the cosine drive function results in a modulation ratio less than 1, and each phase may be driven to a modulation ratio of 1 for at least a portion of a time when one other phase is not energized and when the cosine drive function results in a modulation ratio greater than or equal to 1.

The cosine drive function may be $$\left|\frac{M}{\cos(\theta - \theta_{wc})}\right|$$

wherein M is a modulation ratio ranging from 0 to 1, wherein θ is an angle of rotation of the three-phase motor, and wherein has a value of 0 degrees when θ is less than 30 degrees and greater than or equal to 0 degrees, a value of 60 degrees when θ is less than 90 degrees and greater than or equal to 30 degrees, a value of 120 degrees when θ is less than 150 degrees and greater than or equal to 90 degrees, a value of 180 degrees when θ is less than 210 degrees and greater than or equal to 150 degrees, a value of 240 degrees when θ is less than 270 degrees and greater than or equal to 210 degrees, a value of 300 degrees when θ is less than 330 degrees and greater than or equal to 270 degrees, and a value of 0 degrees when θ is less than 360 degrees and greater than or equal to 330 degrees.

The first sinusoidal drive function may be $$U_{2pm} = \frac{2}{\sqrt{3}} M * \{U_{3pm} - \min(U_{3pm}, V_{3pm}, W_{3pm})\},$$

the second sinusoidal drive function may be $$V_{2pm} = \frac{2}{\sqrt{3}} M * \{V_{3pm} - \min(U_{3pm}, V_{3pm}, W_{3pm})\},$$

and the third sinusoidal drive function may be $$W_{2pm} = \frac{2}{\sqrt{3}} M * \{W_{3pm} - \min(U_{3pm}, V_{3pm}, W_{3pm})\},$$

wherein $U_{3pm} = \frac{1}{2}\sin\theta, \ V_{3pm} = \frac{1}{2}\sin\left(\theta - \frac{2}{3}\pi\right),$ $$W_{3pm} = \frac{1}{2}\sin\left(\theta - \frac{4}{3}\pi\right),$$

wherein M is a modulation ratio ranging from 0 to 1, and wherein θ is an angle of rotation of the three-phase motor.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
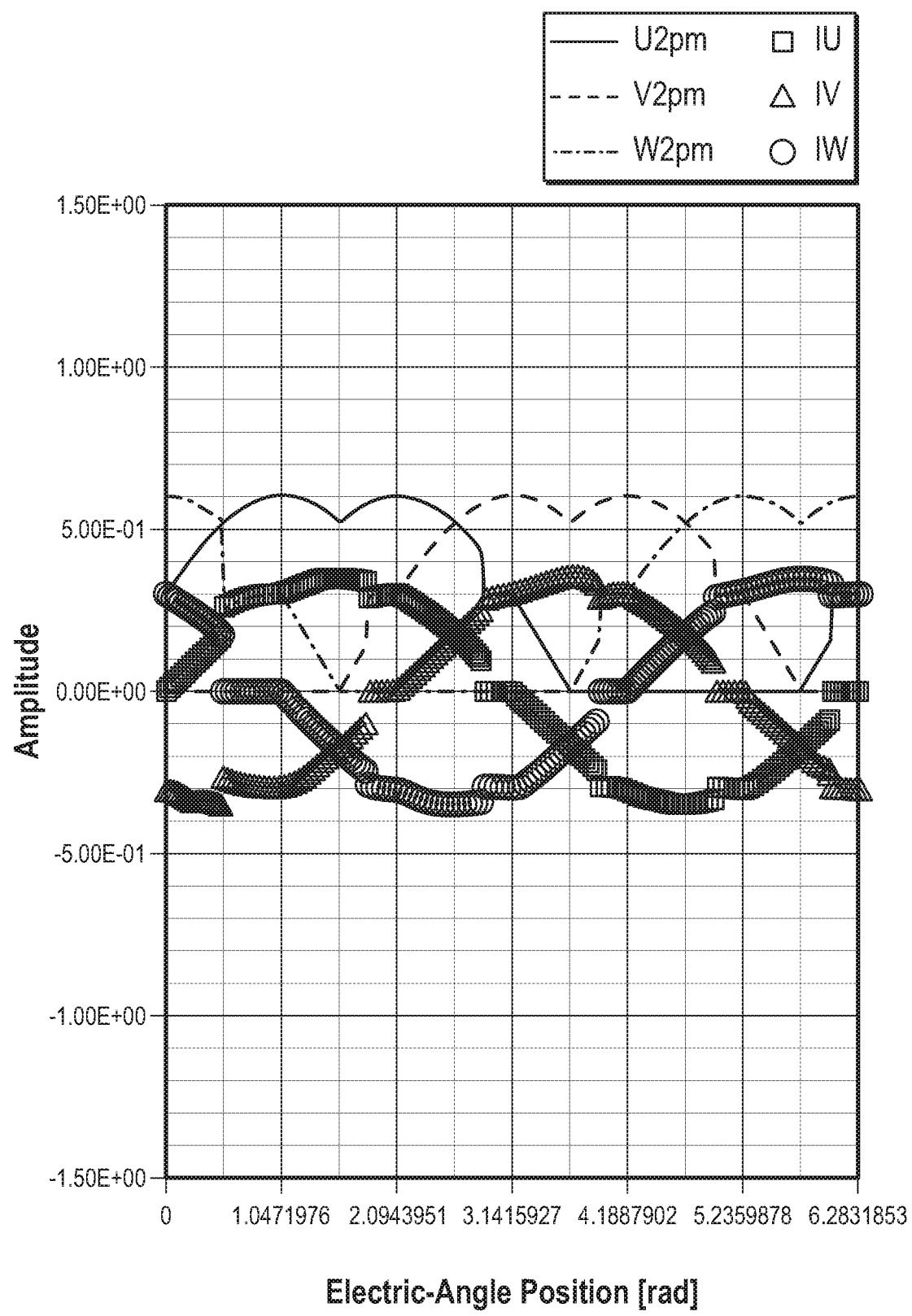
FIG. 1 is a graph of voltage and current amplitude plotted as a function of electric angle position of the rotor for an implementation of a method of driving a three-phase motor.

This disclosure, its aspects and implementations, are not limited to the specific components, assembly procedures or method elements disclosed herein. Many additional components, assembly procedures and/or method elements known in the art consistent with the intended drive methods of three phase motors will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such drive methods of three phase motors, and implementing components and methods, consistent with the intended operation and methods.

During the operation of a three phase motor, for example at startup and at other times during operation, the motor controller needs to detect the position and rotation speed of the rotor of the motor. Accurately doing so may allow for precise motor control by adjusting the timing of an applied supply voltage to the motor windings. In some motors, Hall sensors may be used to detect the rotor position, but for sensor-less motors, the position may be detected using a back electromotive force (BEMF) signal, such as by comparing the BEMF signal with a voltage to determine when the motor crosses the zero point.

During BEMF detection the phase used to detect the BEMF signal may be temporarily non-energized, causing a variation in output torque referred to as a "torque ripple." Due to torque ripples the output torque of the motor may continuously vary between two or more values. Torque ripples may affect performance of a motor, reduce motor efficiency, increase the noise produced by a motor, increase wear and tear of motor components, and decrease the life of motor components and the motor in general.

The methods disclosed herein include three-phase motor modulation methods which improve drive torque ripple. Each phase of a three-phase motor represents one of the windings of the motor stator. In implementations the methods may improve drive torque ripple in an N-window drive method. An N-window drive method is one which includes windows where one phase is non-excited while its phase BEMF voltage is detected. While different types of three-phase motors may benefit from the methods disclosed herein, one example of a motor that can be driven using the methods disclosed herein is a star-connected three-phase brushless direct current (BLDC) motor. Another example is a star-connected three phase permanent magnet synchronous motor (PMSM or SPMSM). For perfect compensation of reduced torque during BEMF sensing a method such as strict field orientation control (FOC) (vector control) could be applied. The methods disclosed herein do not use vector control and are useful for situations where it is desirable to improve (reduce/eliminate) torque ripple but where perfect compensation is not required and/or where vector control is prohibitively expensive or otherwise not an option. The methods disclosed herein include the use of algorithms used to drive three-phase motors, which driving may be controlled by one or more integrated circuits. In one example the integrated circuit is a field-programmable gate array (FPGA), though in other implementations other programmable and non-programmable (i.e. ASIC) circuit types could be used.

For N-window drive systems wherein one of the three phases is non-excited while its phase BEMF voltage is detected, due to the non-excited phase the system cannot apply an ideal drive-torque vector to the motor and the motor operation includes torque ripples.

Referring now to FIG. 1, a graph representing control of a three-phase motor includes voltage and current amplitudes plotted as a function of electric angle position of the rotor of the motor. The drive voltage amplitudes ($U_{2pm}$, $V_{2pm}$, $W_{2pm}$, wherein U, V and W are the phases and 2 pm represents two phase modulation with a non-exciting phase) represent motor terminal voltage and are plotted using a line, a dashed line, and a dashed and dotted line, respectively. The phase drive current amplitudes (IU, IV, and IW) represent phase current (motor stator current) and are plotted using squares, triangles, and circles, respectively. For simplicity, the stator inductances and BEMF voltages are omitted for ease of viewing the other details of the graph. The electric angle position of the rotor is given in radians. It may be seen from the current amplitudes that the current of each phase is generally sinusoidal, but that for each phase there are windows where the current is intentionally zero for a period of time. This is the N-window and may otherwise be referred to as a HiZ (high impedance) state for that phase. For example, when the U phase is in a zero phase current window (N-window or HiZ window) the BEMF zero-cross point may be determined for determining the rotor position of the motor. During this HiZ window the torque of the motor decreases, resulting in the previously discussed torque ripples. It is pointed out that, while the currents are generally sinusoidal, the applied voltage amplitudes are also generally sinusoidal except at the HiZ windows. In this example a modulation ratio of 0.6 is used.

Figure 2:
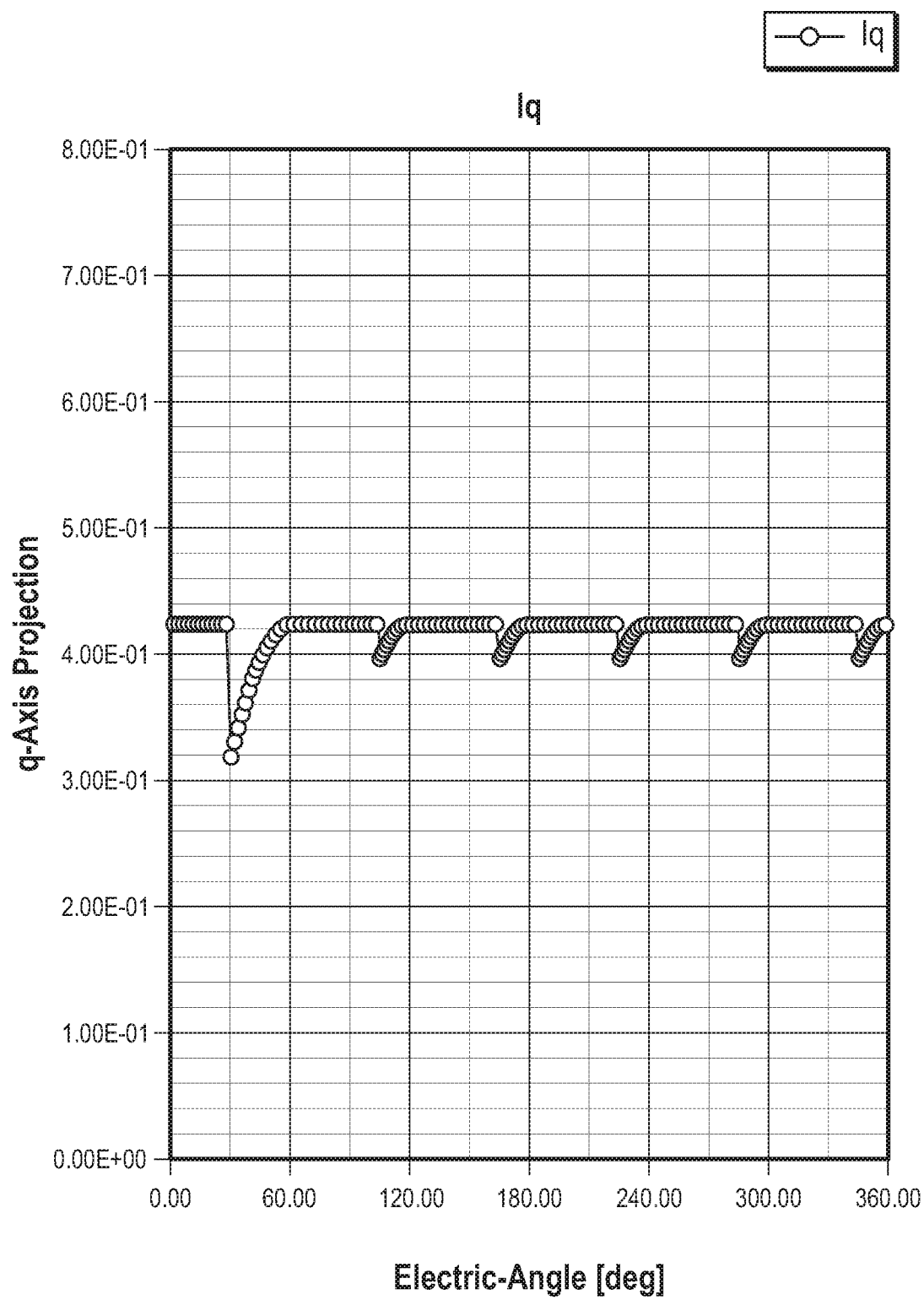
FIG. 2 is a graph of torque plotted as a function of electric angle position of the rotor for the method of FIG. 1 showing torque ripple.

FIG. 2 representatively illustrates the torque of the three phase motor of FIG. 1 plotted against the electric angle of the rotor of the motor (this time represented in degrees). The torque is represented by q-axis current converted by the Clarke-Park transformation, the q-axis current representing generated torque. The torque ripples are visually seen in FIG. 2, with the torque dipping low in several places, each of these dips corresponding with a HiZ window of one of the phases.

Figure 3:
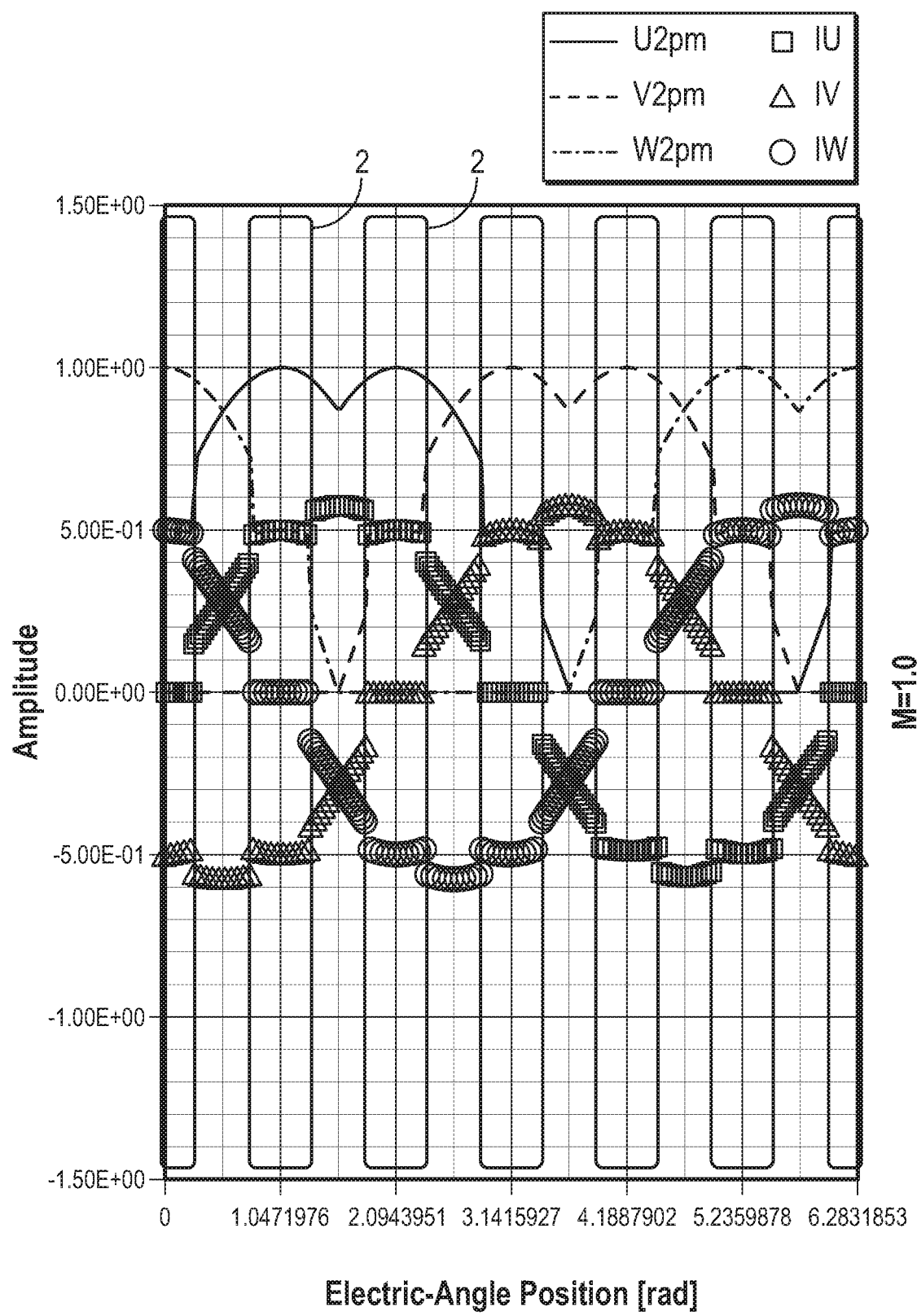
FIG. 3 is a graph of voltage and current amplitude plotted as a function of electric angle position of the rotor for an implementation of a method of driving a three-phase motor.

FIG. 3 shows another example of a graph of voltage and current amplitude plotted as a function of electric angle position for an N-window drive method. Apart from the plotted values, the characteristics/details of this graph are similar to those described above for FIG. 1. In this example the phase currents are again seen to be relatively sinusoidal but to have HiZ periods where the current is intentionally zero for a period of time. The graph of FIG. 3 includes windows 2 which indicate periods wherein a non-exciting phase is used to detect a phase BEMF voltage. The drive method of FIG. 3 uses a modulation ratio of 1.0.

Figure 4:
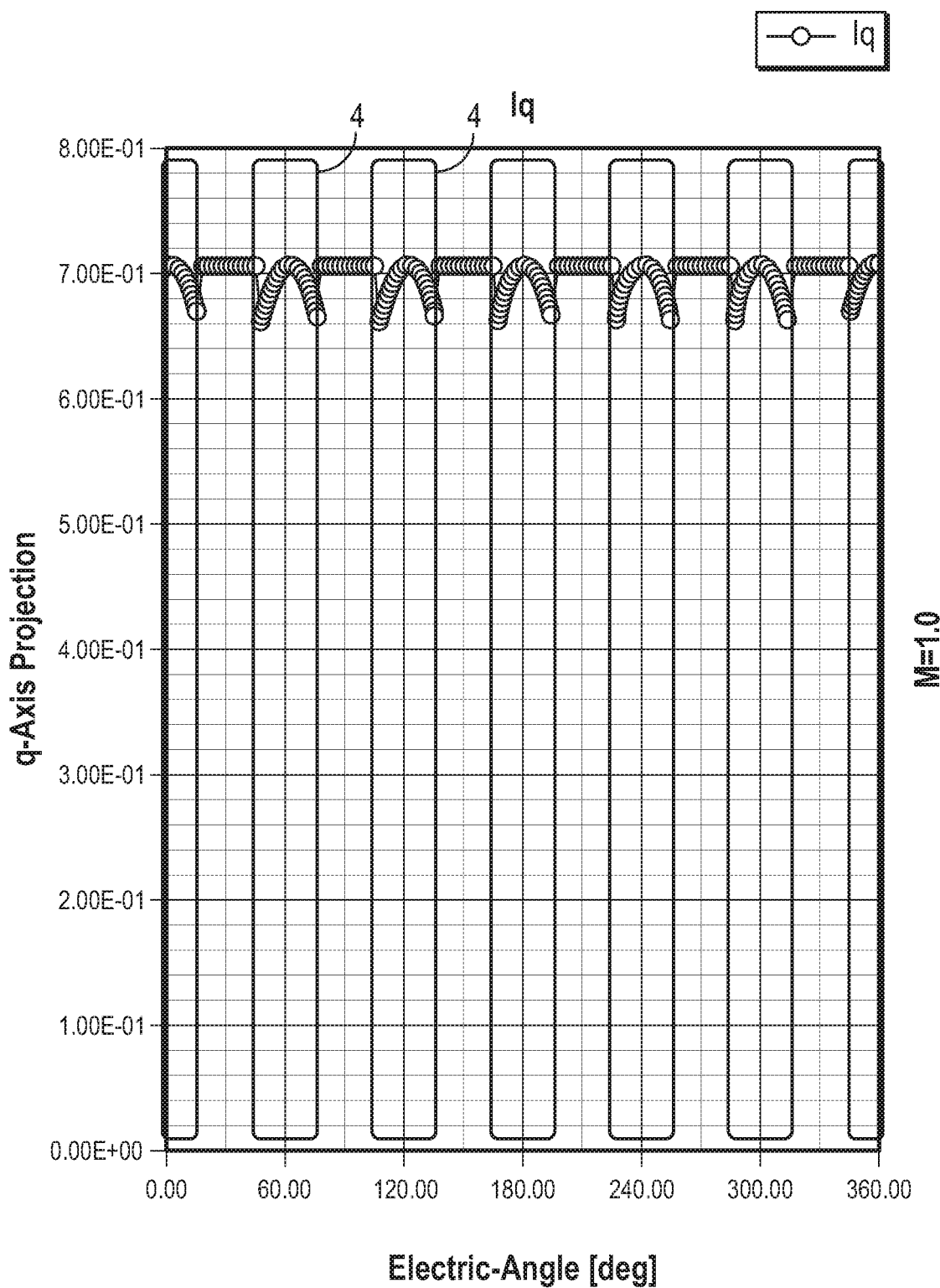
FIG. 4 is a graph of torque plotted as a function of electric angle position of the rotor for the method of FIG. 3.
Figure 5:
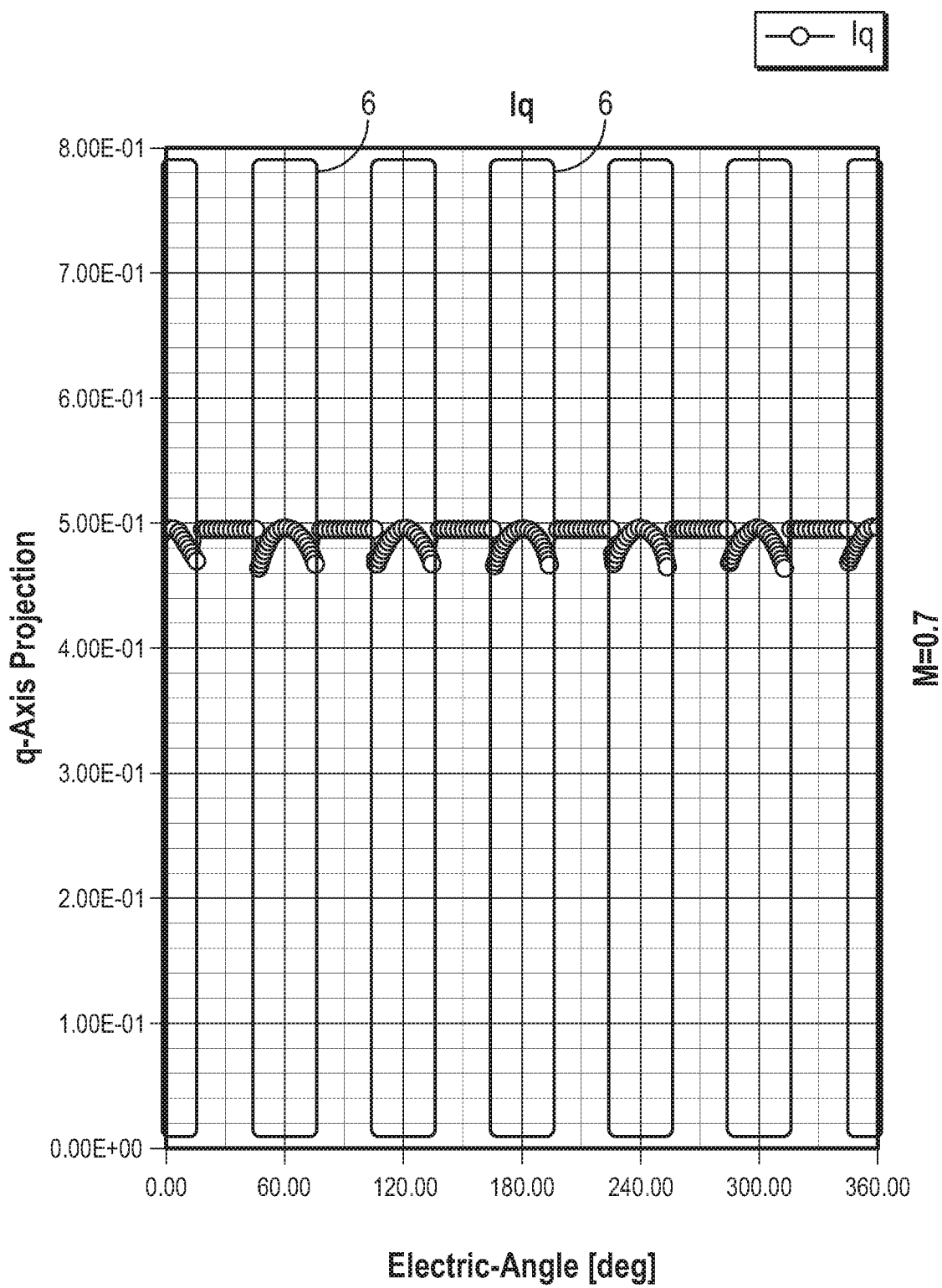
FIG. 5 is a graph of torque plotted as a function of electric angle position of the rotor for a method of driving a three-phase motor.

FIG. 4 representatively illustrates torque plotted as a function of electric angle position of the rotor for the drive method of FIG. 3. Apart from the plotted values, the characteristics/details of this graph are similar to those described above for FIG. 2. Torque ripples are again seen. Windows 4 shown on the graph align with the torque ripples and also align with the HiZ windows 2 of FIG. 3, and it is seen that the torque ripples correspond with the HiZ windows. FIG. 5 represents a torque plot for a drive method similar to that of FIG. 3 except where the drive method uses a modulation ratio of 0.7. The torque ripples are still seen in the windows 6 which correspond with HiZ windows of the drive method where a phase BEMF voltage is detected.

Figure 6:
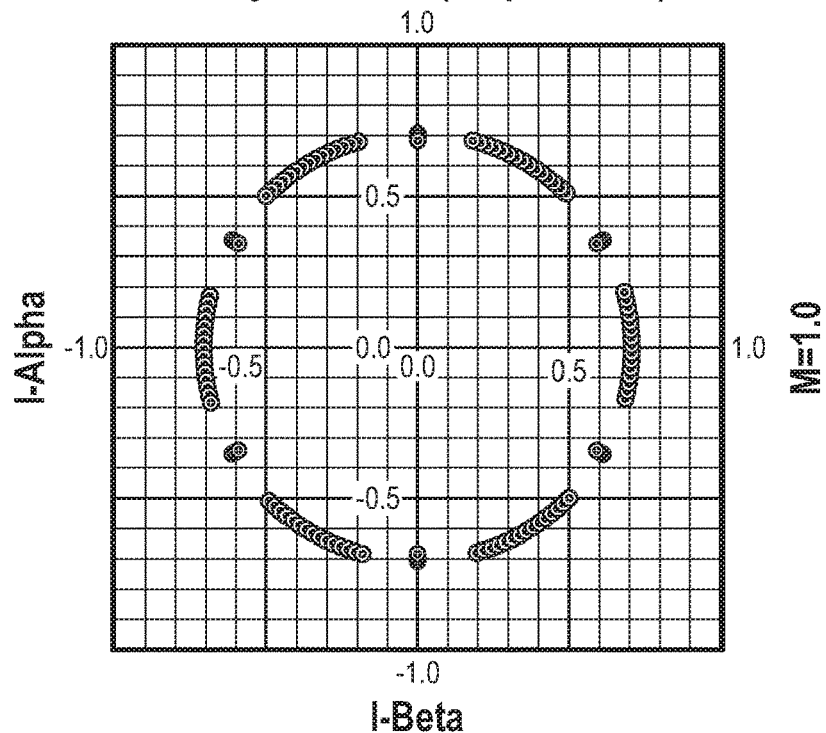
FIG. 6 is a graph of a Lissajous curve for the method of FIG. 3.
Figure 7:
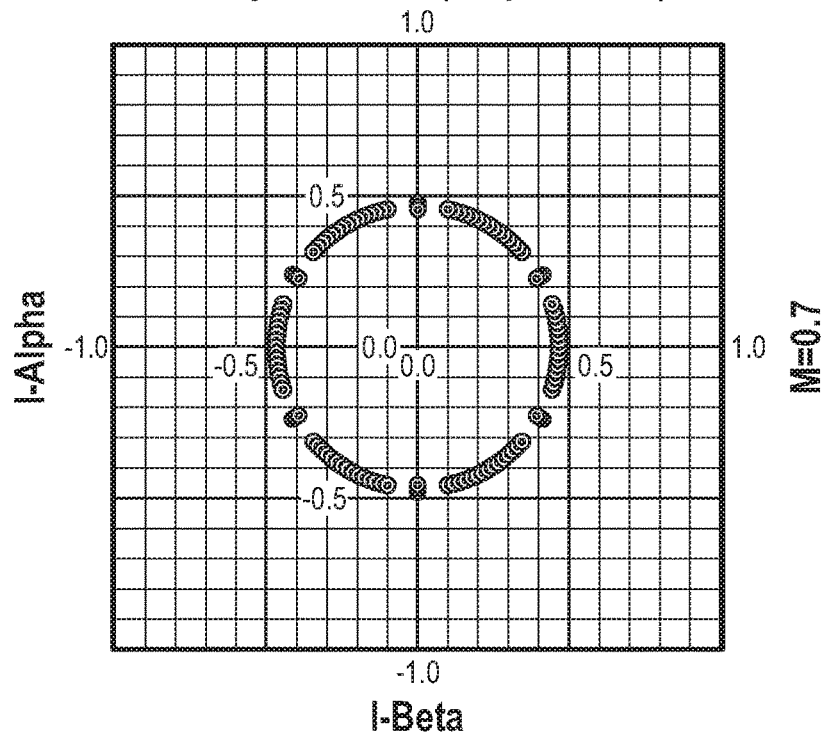
FIG. 7 is a graph of a Lissajous curve for a method similar to the method of FIG. 3 except using a modulation ratio of 0.7.

FIG. 6 shows a Lissajous curve of drive current converted by the Clarke transformation for the drive method of FIG. 3 with a 1.0 modulation ratio. The I-Alpha axis is the Alpha-axis current and the I-Beta axis is the Beta-axis current. The Lissajous curve shows where the torque is when the current is applied and the motor is applied. Where there are no circles on the curve, this indicates the torque jumping from one value to another—these locations correspond with the torque ripples of FIGS. 4 and 5. FIG. 7 shows a Lissajous curve of drive current converted by the Clarke transformation for a drive method similar to the method of FIG. 3 except using a 0.7 modulation ratio. Other than the plotted values, the characteristics/details of the graph of FIG. 7 are similar to those of FIG. 6.

When an original drive modulation ratio for a drive method is less than 100%, two phases (the phases other than the current HiZ, non-excited phase) can be modulated by a ratio greater than the original modulation ratio to decrease the reduction in torque caused by the HiZ window. The motor torque is generated by q-axis current and the q-axis current is a vector (stator current vectors of three phases are projected to the q-axis).

As mentioned above the N-window drive methods include a non-exciting time periods. In this disclosure the N-period or non-excited period for any given phase is referred to as a window period, whereas an exciting period for any given phase is referred to as an energization period. For any given phase an energization period starts when a window period ends, and when a window period starts an energization period ends. When any given phase is in an energization period there are two potential situations. Either all phases are in an energization period (termed herein as an ALLENG period) or one phase other than the given phase is in a window period (termed herein as a WNDENG period).

As a simple example, returning to FIG. 3 it may be seen that at an electric angle position of $\pi/3$ (~1.0471976) the V phase has a negative current, the U phase has a positive current, and the W phase is at zero current. From the perspective of the V phase or the U phase, this would be a WNDENG period. At an electric angle position of $\pi/6$ (~0.523599) the V phase has a negative phase current and the U and W phases both have positive phase current. This would accordingly be an ALLENG period. Whether a phase is "energized/excited" or in an "energized/excited state," as those terms are used herein, is accordingly determined by the phase's current being either zero (non-energized/excited) or having a non-zero value (energized/excited), and not whether the phase drive voltage is zero or non-zero. For example, in FIG. 3 it may be seen that at the electric angle position of $\pi/6$ (~0.523599) the V phase has zero drive voltage while the U and W phases both have a positive drive voltage. The zero drive voltage for the V phase does not mean that the V phase is not energized/excited because, as defined herein, the phase is excited/energized if the phase current is non-zero. Similarly, at the electric angle position of $\pi/3$ (~1.0471976) the W phase is non-energized/non-excited, even though it has a positive/non-zero voltage, because it has zero phase current.

Figure 32:
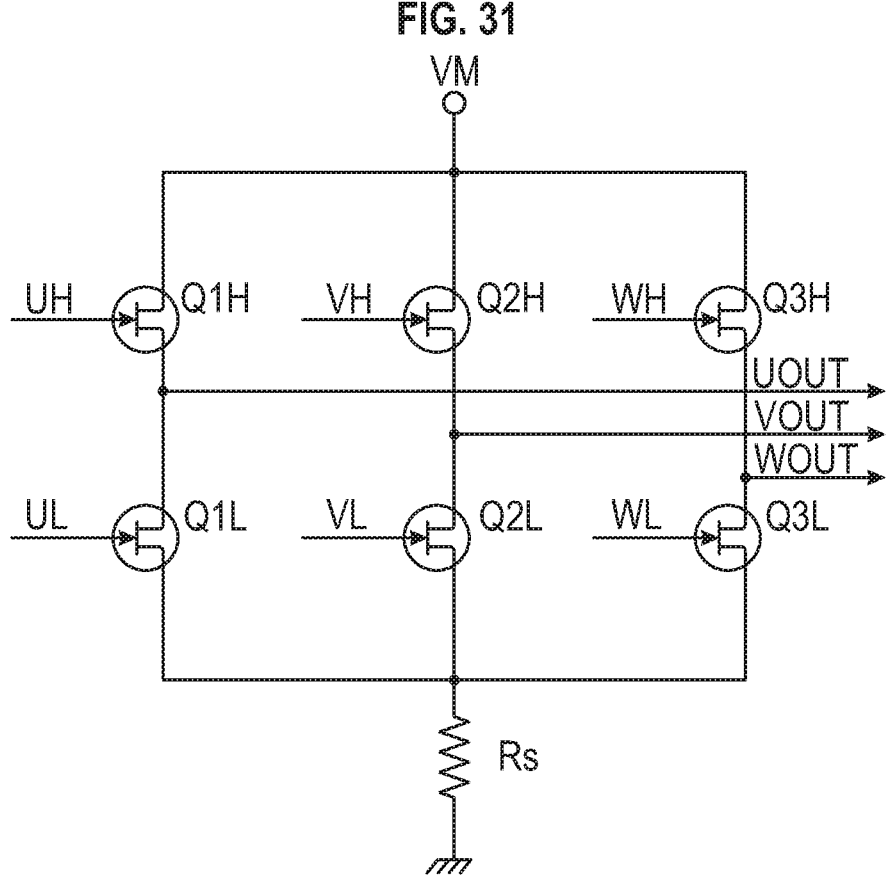
FIG. 32 is a circuit diagram representatively illustrating a circuit of a controller used to control a three-phase motor.

Furthermore, still making reference to FIG. 3 and also making reference to FIG. 32 which describes a circuit diagram that may be used in a controller controlling the three-phase motor, and ignoring Rs resistance, at the electric angle position of π/3 (~1.0471976) the inverter's Q1H and Q1L are switching using pulse width modulation (PWM), Q2H is OFF and Q2L is ON, and Q3H and Q3L are OFF. UOUT therefore outputs non-zero volts, VOUT outputs zero volts, and WOUT outputs the HiZ state. As PWM is performed with synchronous rectification and the motor's stator is an inductance load, there are generating currents and regenerative currents (also a zero volt/zero drive node may operate as a sink node for another source node). During this angle position although VOUT outputs zero volts, IV (V phase current) is flowing via the U phase (meaning UOUT is a source node and VOUT is a sink node). Accordingly, even if VOUT outputs zero volts during this time period, the motor's V phase is energized via the U phase. At this same time period, however, IW (W-phase current) is not flowing, even though WOUT has a positive voltage, because its positive voltage is not drive voltage based on the WOUT output, so the W phase is not energized/excited. Node voltage during a non-energized period indicates a generated voltage (from impedance of the other two phases) and has a value of the sum of the other two phase voltages divided in half. BEMF voltage is overlapped with this period but, as indicated, is not included in the drawings for simplicity.

Figure 8:
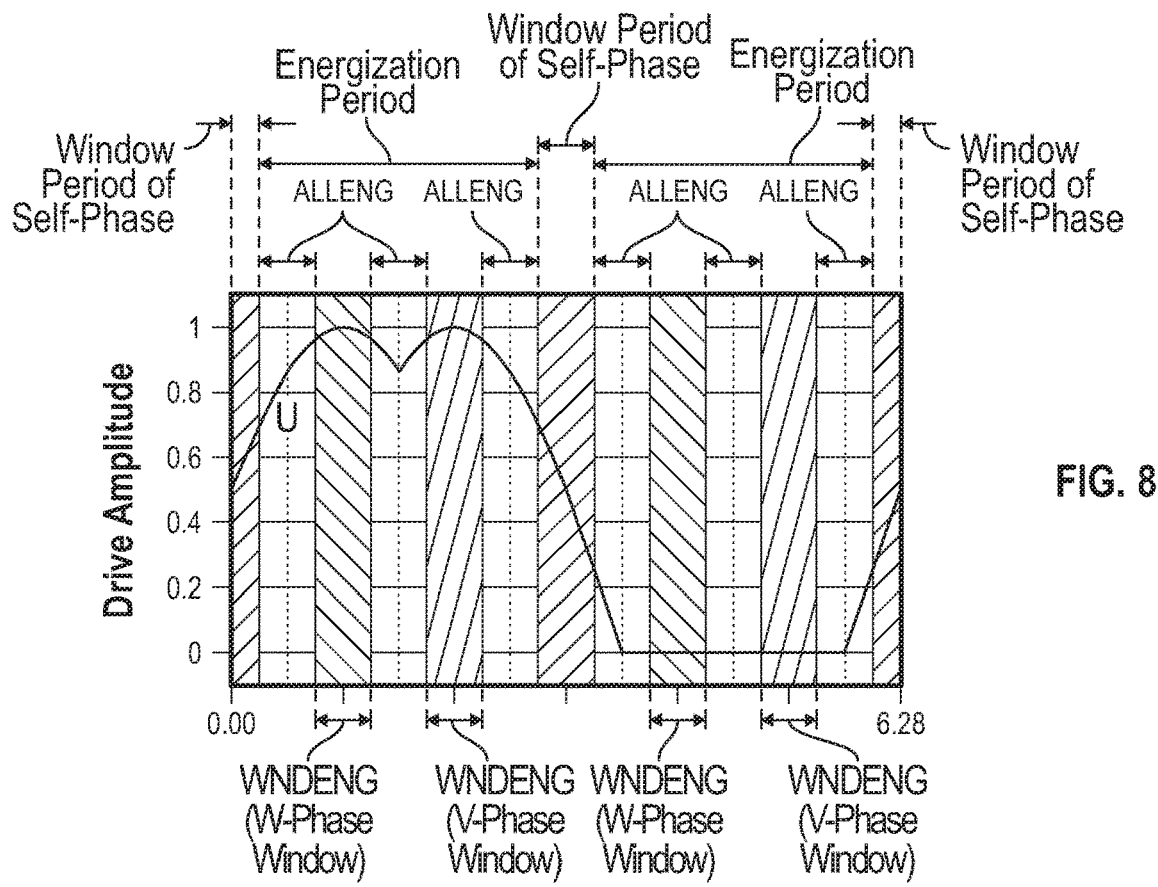
FIG. 8 is a diagram representing control of a U phase in a method of driving a three-phase motor.

Referring now to FIG. 8, a diagram is illustrated that represents control of a U phase in a method of driving a three-phase motor. This graph diagrams voltage drive amplitude for the phase plotted against the electric angle of the rotor (in radians). At the top of this graph are called out "Window Period of Self-Phase" portions which are window periods for the U phase or, in other words, periods where the U phase may be placed in a HiZ state (with zero phase current) to perform a BEMF detection. Also called out are "Energization Period" portions which indicate periods where the U phase has a non-zero phase current (even if the drive voltage is zero) so that the U phase is "energized." It is also illustrated that the energization periods alternate between ALLENG periods (where all phases are energized) and WNDENG periods (where one other phase is not energized). In this example there are six windows—two for the U phase itself (the first and last window periods being halves of a single window), two for the W phase, and two for the V phase. Each section accordingly represents 30 degrees of rotation of the rotor. Similar graphs could be prepared for control of the V phase and the W phase. This diagram is an example of control of a phase in 6-window mode.

Figure 9:
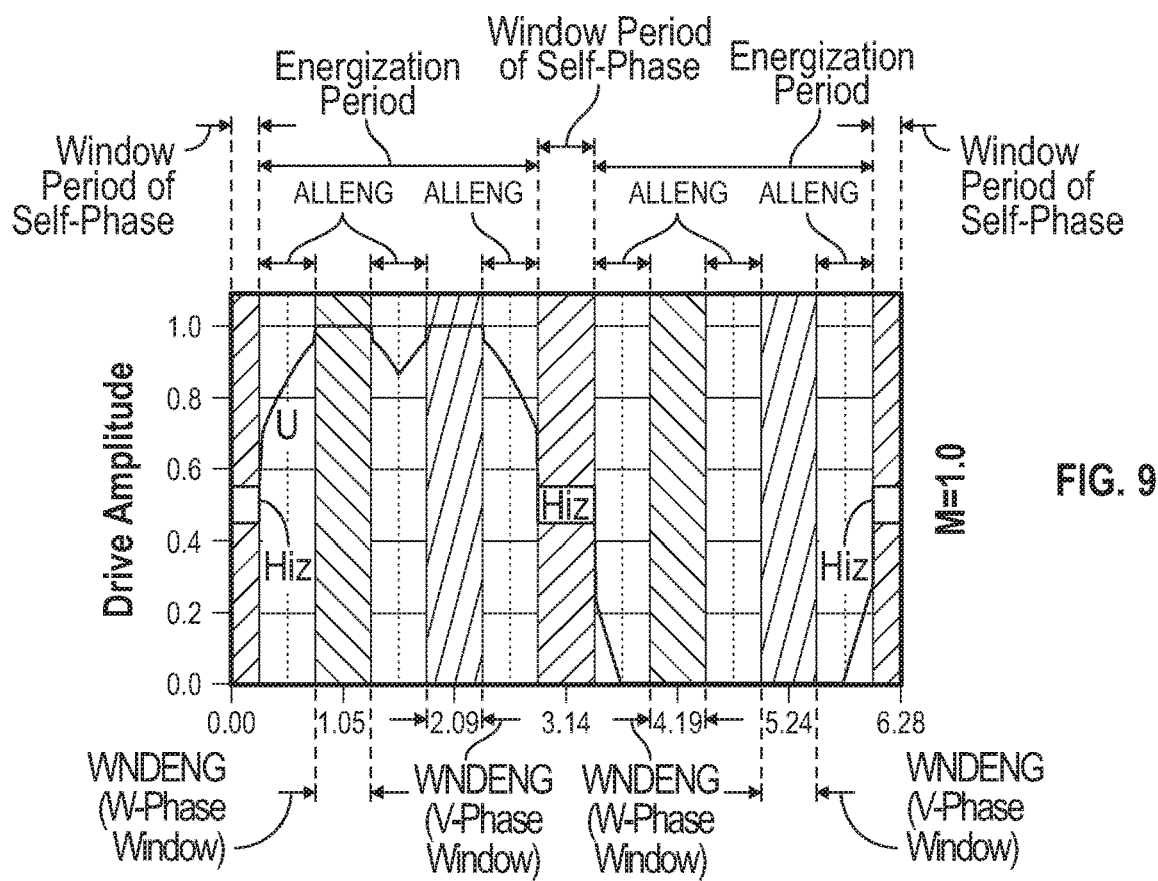
FIG. 9 is a diagram representing control of a U phase in a method of driving a three-phase motor.

The graph of FIG. 8 represents control of the U phase without modifying voltage during the WNDENG periods, and accordingly the torque ripples discussed above would be present. FIG. 9, on the other hand, shows a similar graph for the U phase, in 6-window mode with 30-degree windows, but wherein when a positive voltage is being applied to the U phase and when a WNDENG window is reached, the applied voltage to the U phase switches temporarily from a sinusoidal waveform to a different waveform. The different waveform results in an increased voltage for the U phase. In this example the modulation ratio is 1.0. The HiZ periods/windows for the U phase are also shown in this graph. The ALLENG periods for the U phase are controlled based on a first 2-phase modulation waveform and the WNDENG periods for the U phase are controlled by a second 2-phase modulation waveform. In implementations the second 2-phase modulation waveform could be a processed or modified version of the first waveform, or it could be an entirely different waveform not based on the first waveform. In either case, the second waveform (and, in general, the different waveforms during the WNDENG periods) are termed herein as low torque ripple (LTR) modulation waveforms, as they reduce torque ripple. Although the graph of FIG. 9 focuses on the U phase, graphs depicting the control/drive voltages of the V and W phases would be similar (but offset by 120 degrees and 240 degrees from the U phase, respectively).

Figure 10:
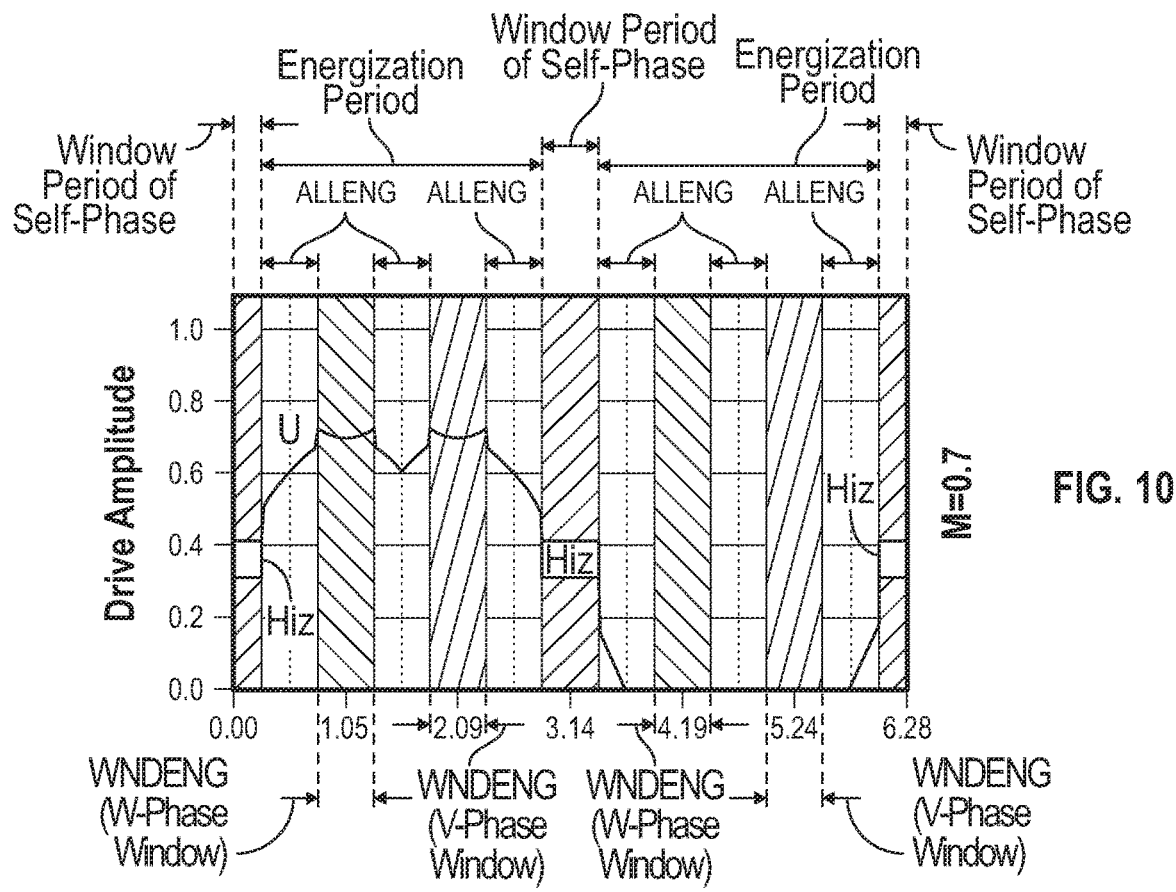
FIG. 10 is a diagram representing control of a U phase in a method of driving a three-phase motor.

FIG. 10 is a diagram representing control of a U phase in a method of driving a three-phase motor and is similar to FIG. 9 except that a modulation ratio of 0.7 is used. Again, when a positive voltage is being applied to the U phase and a WNDENG window is reached, the applied voltage to the U phase switches temporarily from a sinusoidal waveform to a different waveform (LTR waveform). The LTR waveform is seen to be different from what it was for the 1.0 modulation ratio version of FIG. 9 but, still, generally results in an increase in voltage for at least some of the WNDENG periods compared with what would be applied using the original sinusoidal wave function. It is seen that for the WNDENG periods where the U phase has zero applied voltage the applied voltage remains at zero. Nevertheless, at these WNDENG windows the applied voltage to other phases may be increased to reduce torque ripple. Although the graph of FIG. 10 focuses on the U phase, graphs depicting the control/drive voltages of the V and W phases would be similar (but offset by 120 degrees and 240 degrees from the U phase, respectively).

The LTR waveforms used during the WNDENG windows decrease the dip in torque at the HiZ windows. Accordingly, even though one of the three phases of the motor stator is in a non-excited state, the reduction in torque is not as great as it would be. The substituted LTR waveform is accordingly defined so that torque ripple is reduced. In implementations, when one phase is non-excited, the other two phases are excited and are driven by substituting the LTR drive value(s) instead of the normal sinusoidal drive values. In other implementations, when one phase is non-excited, the other two phases are excited but only one of them is driven by substituting the LTR drive value(s) instead of the normal sinusoidal drive values. In the implementations described and shown herein the substituted drive values are tailored to a star-connection stator. In other implementations, however, the principles and methods disclosed herein may be adapted to be used with other types of motors. The graphs of FIGS. 9 and 10, as indicated, have 6 WNDENG windows. This is the maximum amount of windows per an electric angle period of the rotor for substituting LTR drive values in place of the normal sinusoidal drive value(s). The segment width is defined within +/−30 degrees centered at zero-cross points of phase BEMF.

Figure 11:
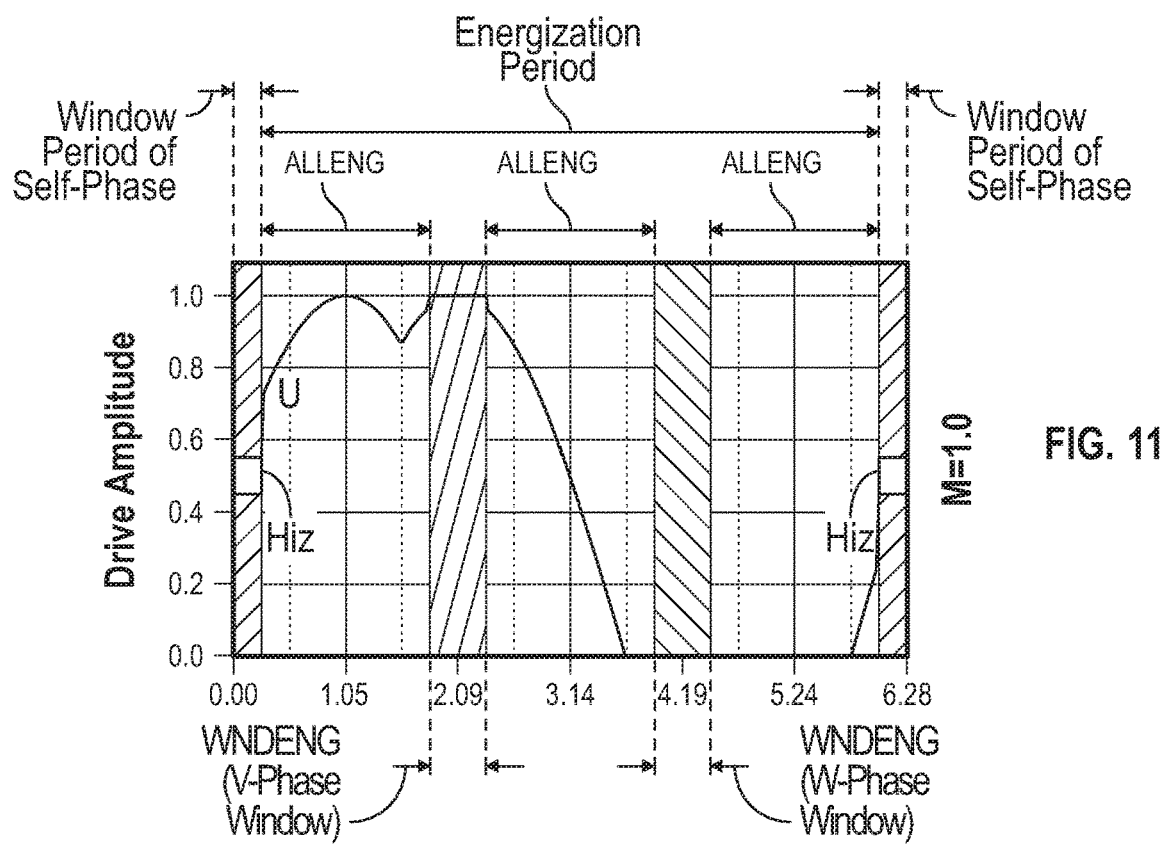
FIG. 11 is a diagram representing control of a U phase in a method of driving a three-phase motor.

FIG. 11 shows a diagram representing control of a U phase in a method of driving a three-phase motor, in 3-window mode with 30-degree windows. When a positive voltage is being applied to the U phase and a WNDENG window is reached, the applied voltage to the U phase switches temporarily from a sinusoidal waveform to an LTR waveform. The LTR waveform results in an increased drive voltage for at least part of the WNDENG period relative to the normal sinusoidal drive waveform. When the WNDENG window is ended, the applied voltage to the U phase switches back to the normal sinusoidal waveform. In this example the modulation ratio is 1.0. The HiZ periods/windows for the U phase are also shown in this graph. Although the graph of FIG. 11 focuses on the U phase, graphs depicting the control/drive voltages of the V and W phases would be similar (but offset by 120 degrees and 240 degrees from the U phase, respectively).

Figure 12:
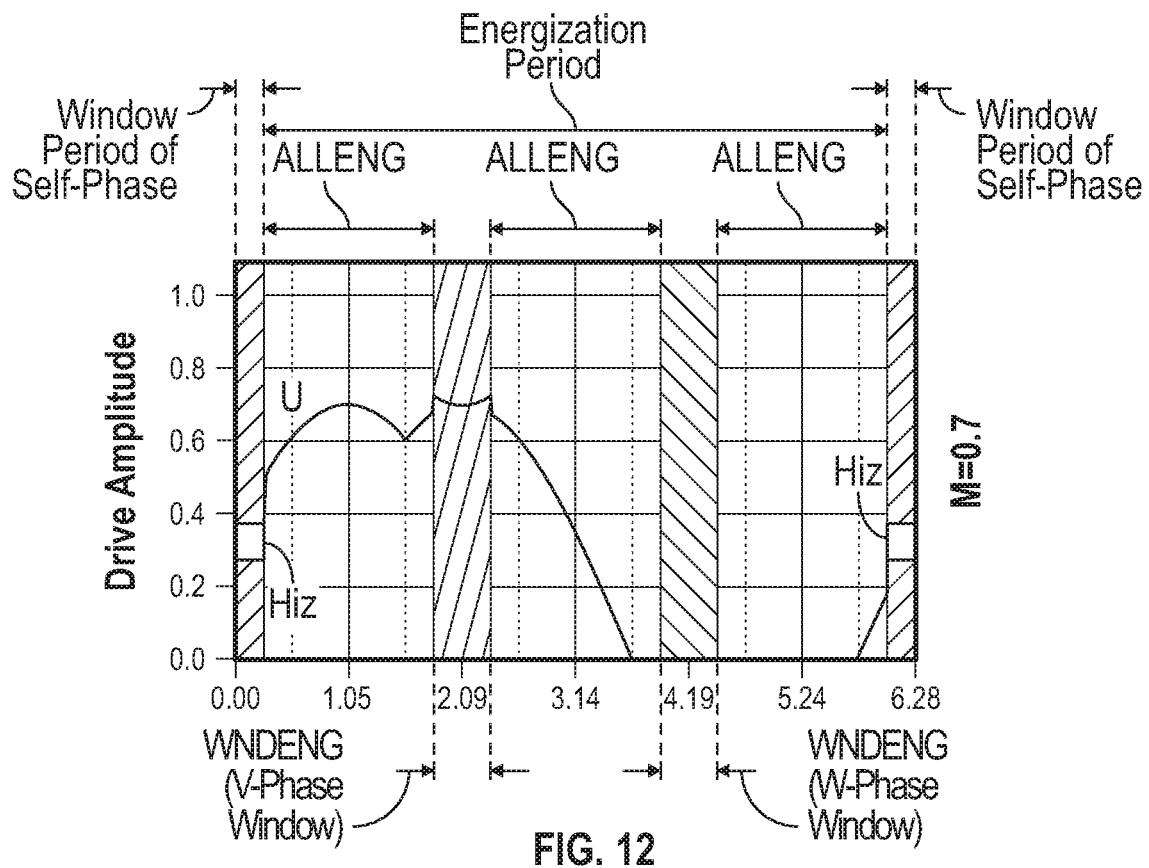
FIG. 12 is a diagram representing control of a U phase in a method of driving a three-phase motor.

FIG. 12 is a diagram representing control of a U phase in a method of driving a three-phase motor and is similar to FIG. 11 except that a modulation ratio of 0.7 is used. Again, when a positive voltage is being applied to the U phase and a WNDENG window is reached, the applied voltage to the U phase switches temporarily from a sinusoidal waveform to an LTR waveform. When the WNDENG window is ended, the applied voltage to the U phase switches back to the normal sinusoidal waveform. The LTR waveform is seen to be different from what it was for the 1.0 modulation ratio version of FIG. 11 but, still, generally results in an increase in voltage for at least some of the WNDENG periods compared with what would be applied using the original sinusoidal wave function. It is seen that for the WNDENG periods where the U phase has zero applied voltage the applied voltage remains at zero. Nevertheless, at these WNDENG windows the applied voltage to other phases may be increased to reduce torque ripple. Although the graph of FIG. 12 focuses on the U phase, graphs depicting the control/drive voltages of the V and W phases would be similar (but offset by 120 degrees and 240 degrees from the U phase, respectively).

Figure 13:
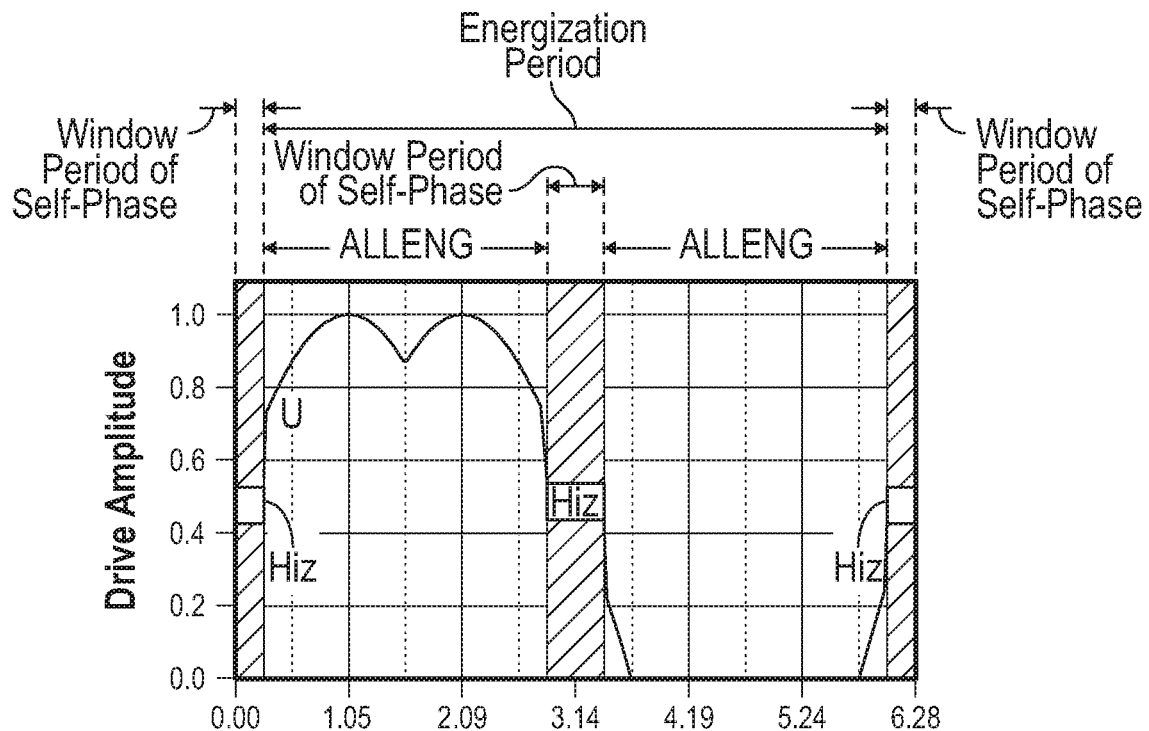
FIG. 13 is a diagram representing control of a U phase in a method of driving a three-phase motor.

FIG. 13 shows a diagram representing control of a U phase in a method of driving a three-phase motor in 2-window mode with 30-degree windows. In this case there are no WNDENG windows because in the 2-window mode the V phase and W phase do not have HiZ windows/periods. Accordingly, the U phase is controlled by the normal sinusoidal waveform without any LTR waveform.

Figure 14:
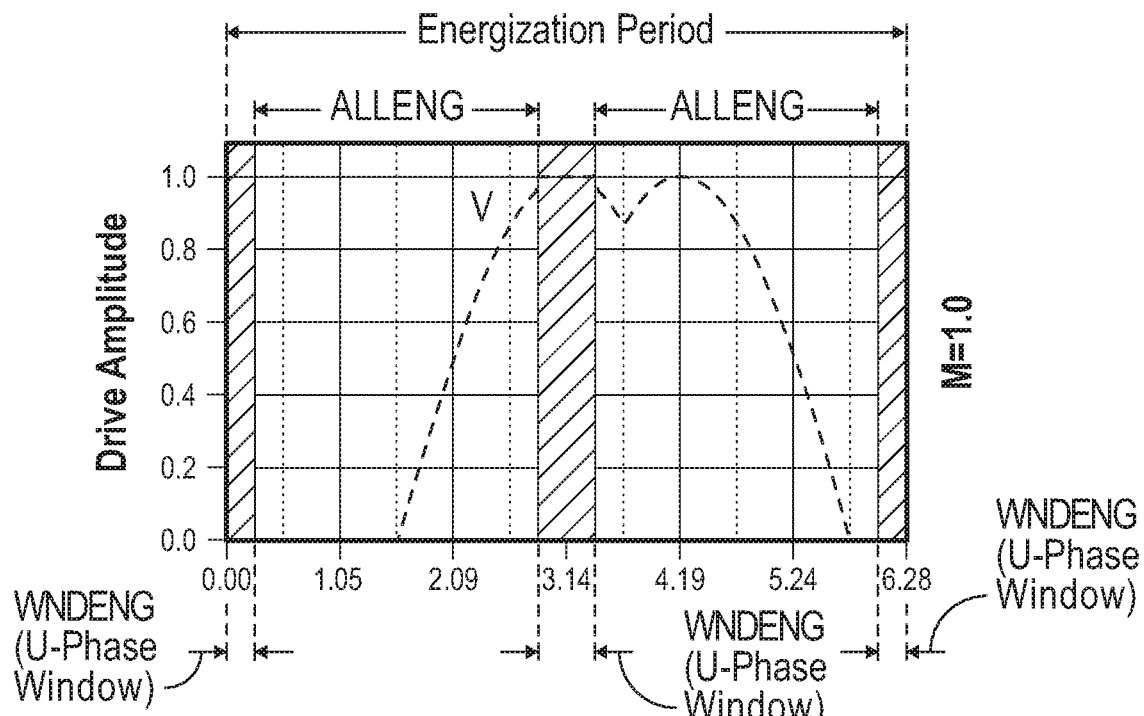
FIG. 14 is a diagram representing control of a V phase in a method of driving a three-phase motor.

FIG. 14, however, shows a diagram representing control of a V phase in a method of driving a three phase motor in 2-window mode with 30 degree windows. When a positive voltage is being applied to the V phase and a WNDENG window is reached (for a U phase HiZ window), the applied voltage to the V phase switches temporarily from a sinusoidal waveform to an LTR waveform. The LTR waveform results in an increased drive voltage for at least part of the WNDENG period relative to the normal sinusoidal drive waveform. When the WNDENG window is ended, the applied voltage to the V phase switches back to the normal sinusoidal waveform. In this example the modulation ratio is 1.0. This graph also shows that the V phase has no HiZ periods/windows. Although the graph of FIG. 14 focuses on the V phase, a graph depicting the control/drive voltage of the W phase would be similar (but offset by 120 degrees from the V phase).

Figure 15:
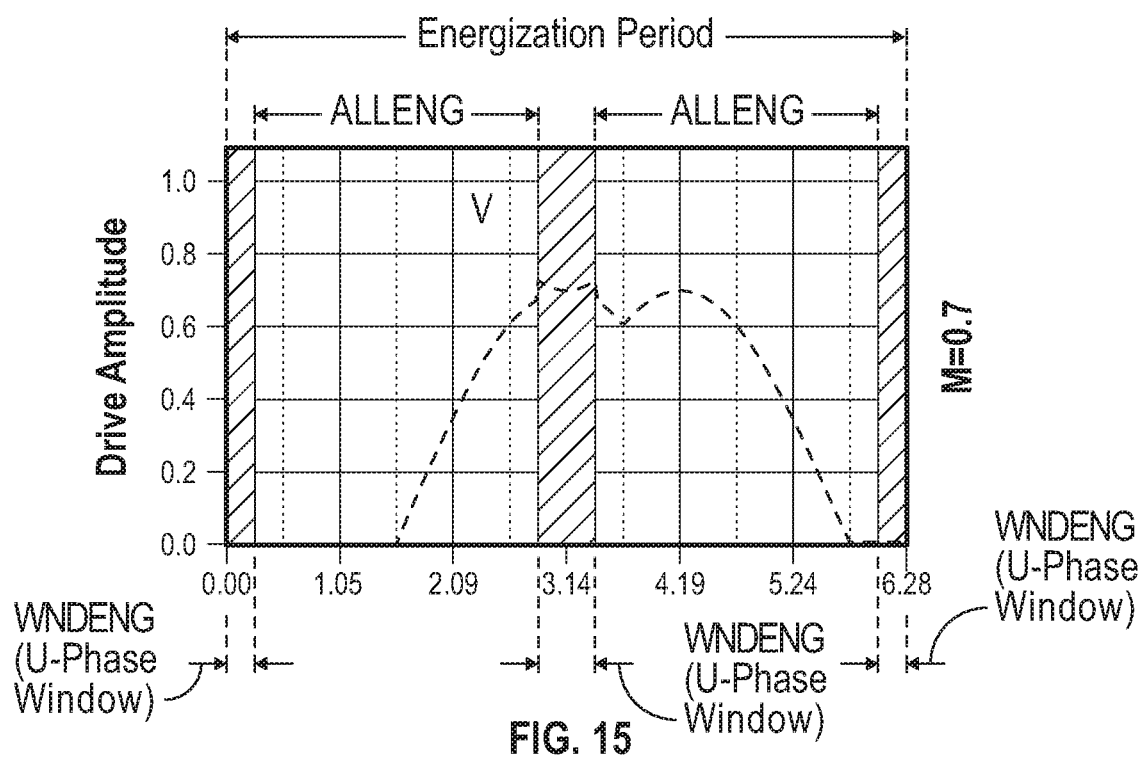
FIG. 15 is a diagram representing control of a V phase in a method of driving a three-phase motor.

FIG. 15 is a diagram representing control of a V phase in a method of driving a three-phase motor and is similar to FIG. 14 except that a modulation ratio of 0.7 is used. Again, when a positive voltage is being applied to the V phase and a WNDENG window is reached (for a U phase HiZ window), the applied voltage to the V phase switches temporarily from a sinusoidal waveform to an LTR waveform. When the WNDENG window is ended, the applied voltage to the V phase switches back to the normal sinusoidal waveform. The LTR waveform is seen to be different from what it was for the 1.0 modulation ratio version of FIG. 14 but, still, generally results in an increase in voltage for at least some of the WNDENG period compared with what would be applied using the original sinusoidal wave function. It is seen that for the WNDENG periods where the V phase has zero applied voltage the applied voltage remains at zero. Nevertheless, at these WNDENG windows the applied voltage to the W phase may be increased to reduce torque ripple. Although the graph of FIG. 15 focuses on the V phase, a graph depicting the control/drive voltages of the W phase would be similar (but offset by 120 degrees from the V phase).

Figure 16:
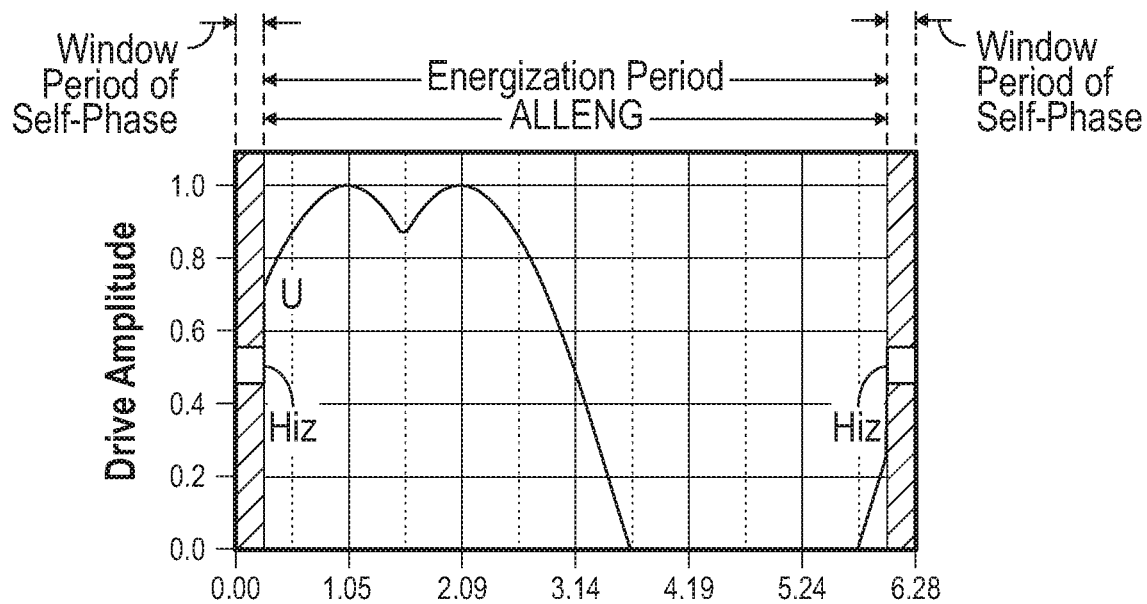
FIG. 16 is a diagram representing control of a U phase in a method of driving a three-phase motor.

FIG. 16 shows a diagram representing control of a U phase in a method of driving a three-phase motor in 1-window mode with 30-degree windows. In this case there are no WNDENG windows because in the 1-window mode the V phase and W phase do not have HiZ windows/periods. Accordingly, the U phase is controlled by the normal sinusoidal waveform without any LTR waveform.

Figure 17:
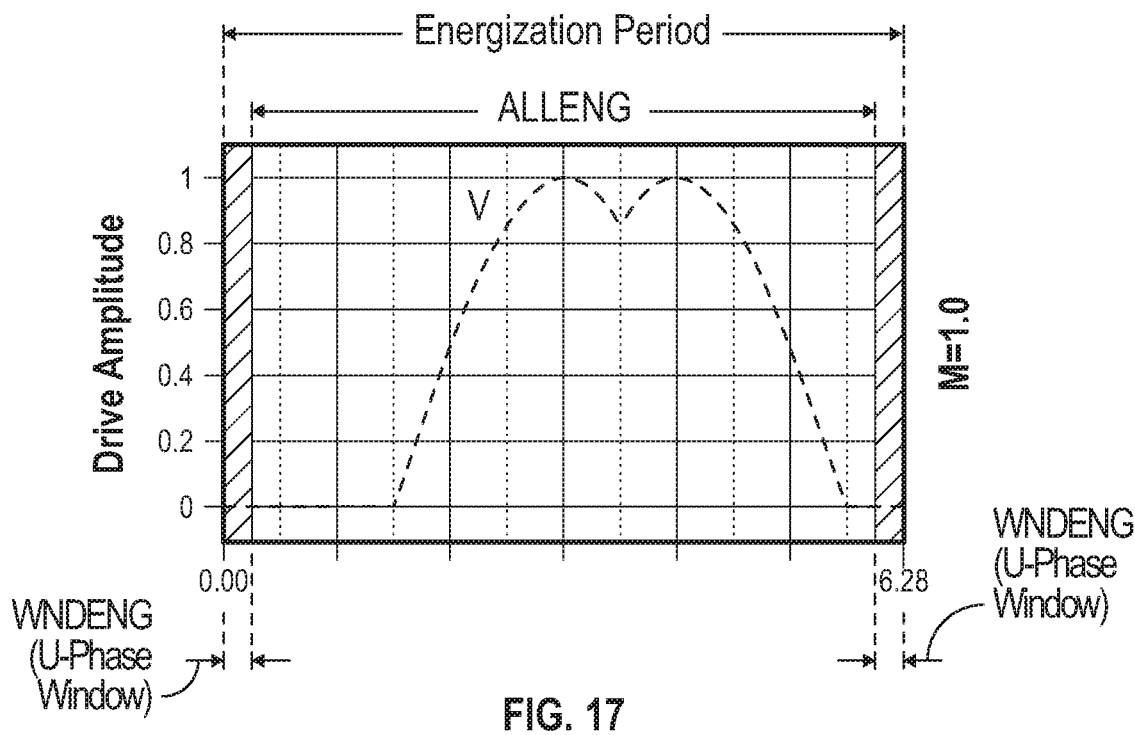
FIG. 17 is a diagram representing control of a V phase in a method of driving a three-phase motor.

FIG. 17 shows a diagram representing control of a V phase in a method of driving a three-phase motor in 1-window mode with 30-degree windows. In this case there is a WNDENG window but it does not correspond with a positive voltage being applied to the V phase, so the V phase is not modified from its normal sinusoidal waveform. The modulation ratio of FIG. 17 is 1.0. A figure is not provided representing control of the W phase in a method of driving a three-phase motor in 1-window mode with 30-degree windows, but the W phase would be offset from the V phase by 120 degrees to that the positive applied voltage to the W phase would overlap with the WNDENG window for the U phase. Accordingly, during the WNDENG window the W phase would be driven by the LTR waveform which would, for at least part of the WNDENG period, result in an increased applied voltage relative to the normal sinusoidal waveform. After the WNDENG period passes the W phase would return to the normal sinusoidal waveform. Qualitatively the difference in the applied voltage to the W phase during the WNDENG period between the 1.0 modulation ratio and a 0.7 modulation ratio would be similar to the difference between the applied voltage to the V phase during the WNDENG period between the 1.0 modulation ratio and 0.7 modulation ratio shown in FIGS. 14 and 15.

There are limits to the window periods for each phase. The limits of the window period (in degrees) is seen in TABLE 1 below.

TABLE 1

| Phase | Limit of Window Period (degrees) |
| --- | --- |
| U | 330 ≤θ <360, 0 ≤θ <30, 150 ≤θ <210 |
| V | 90 ≤θ <150, 270 ≤θ <330 |
| W | 30 ≤θ <90, 210 ≤θ <270 |

Figure 18:
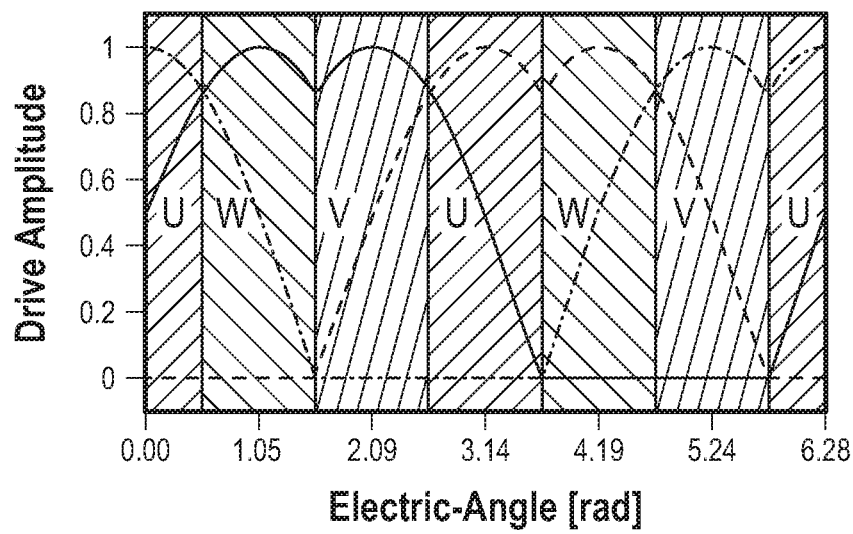
FIG. 18 is a diagram representing windows for detecting a BEMF signal for U, V and W phases in a method of driving a three-phase motor.
Figure 19:
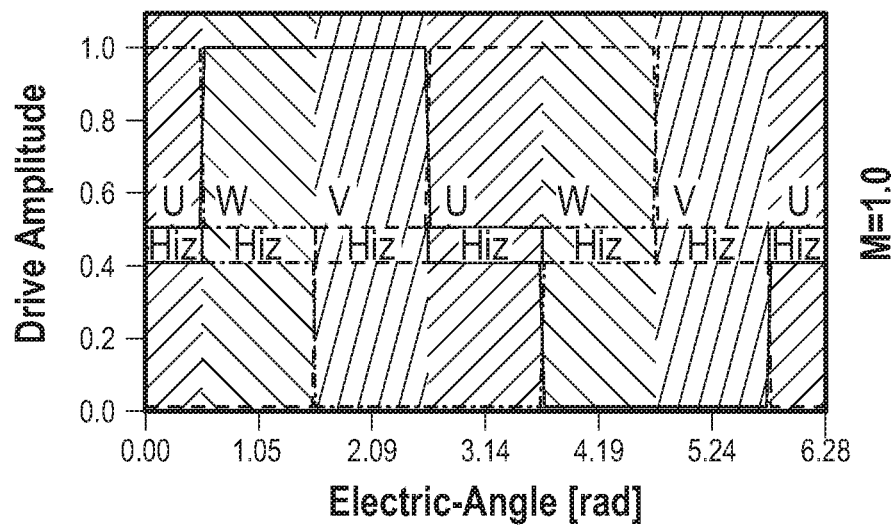
FIG. 19 is a diagram representing windows for detecting a BEMF signal for U, V and W phases in a method of driving a three-phase motor.
Figure 20:
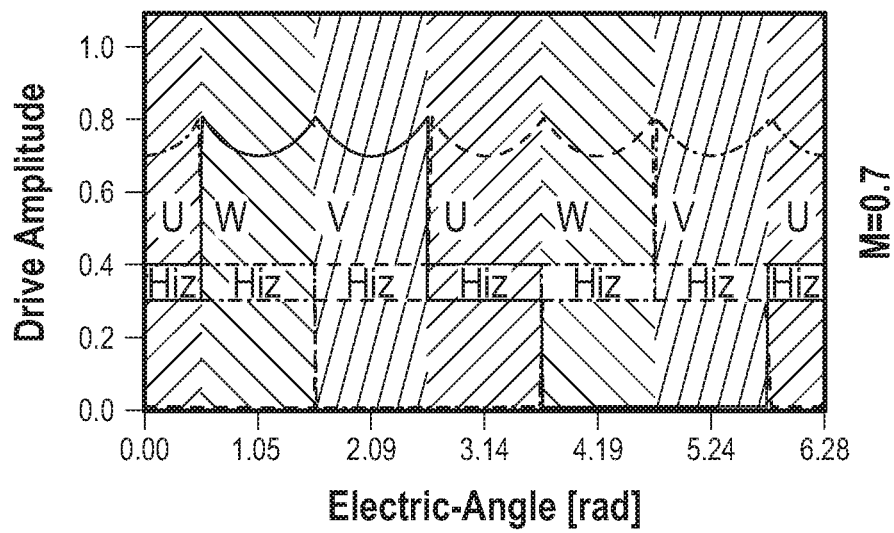
FIG. 20 is a diagram representing windows for detecting a BEMF signal for U, V and W phases in a method of driving a three-phase motor.

FIG. 18 shows the maximum window period for the three phases when a modulation ratio of 1.0 is used and when no LTR waveform is used. The different cross-hatched portions reflect the windows. For example, the W phase is seen to have a first window between 30 and 90 degrees. In radians this is about 0.52 radians to 1.57 radians. Accordingly, on the graph of FIG. 18 there is a first W portion with the letter W close to the W curve but, also, within a first cross-hatched portion from the left of the graph that has lines sloping downwards towards the right. This W portion is depicted between about 0.52 radians and about 1.57 radians, corresponding with the 30 and 90 degrees. The next W portion (with similar cross-hatching) is depicted between 210 and 270 degrees (but, in FIG. 18, in radians). FIG. 19 similarly shows the maximum window period for the three phases when a modulation ratio of 1.0 is used and when LTR waveforms are used. FIG. 20 shows the maximum window period for the three phases when the modulation ratio is 0.7 and LTR waveforms are used. If a BEMF zero-cross has not been able to be detected by the end of a limit as indicated in TABLE 1, the HiZ status is ended according to the limit of the window period. In such a case for continuing operation an interpolation would be performed by the "Rotor Position/Speed Generator" block of the system (illustrated in FIG. 37).

Representative examples of drive functions for the three phases in implementations wherein LTR modulation is used are given below.

$U_{2pm} =$ $$\begin{cases} \frac{2}{\sqrt{3}} M\{U_{3pm} - \min(U_{3pm}, V_{3pm}, W_{3pm})\}, & \text{When } \theta \text{ is ALLENG perod} \\ U_{ltrm}, & \text{When } \theta \text{ is WNDENG period} \\ HiZ, & \text{When } \theta \text{ is } U \text{ window period} \end{cases}$$

$V_{2pm} =$ $$\begin{cases} \frac{2}{\sqrt{3}} M\{V_{3pm} - \min(U_{3pm}, V_{3pm}, W_{3pm})\}, & \text{When } \theta \text{ is ALLENG period} \\ V_{ltrm}, & \text{When } \theta \text{ is WNDENG period} \\ HiZ, & \text{When } \theta \text{ is } V \text{ window period} \end{cases}$$

$W_{2pm} =$ $$\begin{cases} \frac{2}{\sqrt{3}} M\{W_{3pm} - \min(U_{3pm}, V_{3pm}, W_{3pm})\}, & \text{When } \theta \text{ is ALLENG period} \\ W_{ltrm}, & \text{When } \theta \text{ is WNDENG period} \\ HiZ, & \text{When } \theta \text{ is } W \text{ window period} \end{cases}$$

In the above equations some of the values are calculated as follows:

$U_{3pm} = 2^1 \sin \theta$ $V_{3pm} = 2^1 \sin(\theta - \frac{2}{3}\pi)$ $W_{3pm} = 2^1 \sin(\theta - \frac{4}{3}\pi)$ The variables in the above equations are defined as follows:
$U_{2pm}$: U-phase 2-phase modulation waveform (fundamental wave of N-window method)
$V_{2pm}$: V-phase 2-phase modulation waveform (fundamental wave of N-window method)
$W_{2pm}$: W-phase 2-phase modulation waveform (fundamental wave of N-window method)
$U_{3pm}$: U-phase 3-phase modulation waveform
$V_{3pm}$: V-phase 3-phase modulation waveform
$W_{3pm}$: W-phase 3-phase modulation waveform
$U_{ltrm}$: U-phase modulation waveform during a window [low torque ripple (LTR) modulation]
$V_{ltrm}$: V-phase modulation waveform during a window [low torque ripple (LTR) modulation]
$W_{ltrm}$: W-phase modulation waveform during a window [low torque ripple (LTR) modulation]
θ: Rotor position in electric-angle
M: Modulation ratio (0 to 1)

In this representative example, when one of the three phases is in the window period, the normal sinusoidal waveform would result in a decrease of torque. LTR modulation is accordingly applied during the window to reduce torque ripple. In practice LTR modulation should be operated considering a transfer function of a motor stator, though this is ignored herein for simplification and to highlight other aspects of LTR modulation. TABLE 2 below gives modulation ratio assignments for $U_{ltrm}$, $V_{ltrm}$ and $W_{ltrm}$ for different values of θ.

TABLE 2

| θ (degrees) | $U_{ltrm}$ | $V_{ltrm}$ | $W_{ltrm}$ |
|---|---|---|---|
| 0 ≤ θ <30 | HiZ | 0 | $M_{ltr}$ |
| 30 ≤ θ <90 | $M_{ltr}$ | 0 | HiZ |
| 90 ≤ θ <150 | $M_{ltr}$ | HiZ | 0 |
| 150 ≤ θ <210 | HiZ | $M_{ltr}$ | 0 |
| 210 ≤ θ <270 | 0 | $M_{ltr}$ | HiZ |
| 270 ≤ θ <330 | 0 | HiZ | $M_{ltr}$ |
| 330 ≤ θ <360 | HiZ | 0 | $M_{ltr}$ |

The value of $M_{ltr}$ in this representative example is given by the following equation.

$$M_{ltr} = \begin{cases} \left|\frac{M}{\cos(\theta - \theta_{wc})}\right|, & \text{When } \left|\frac{M}{\cos(\theta - \theta_{wc})}\right| < 1 \\ 1, & \text{When } \left|\frac{M}{\cos(\theta - \theta_{wc})}\right| \geq 1 \end{cases}$$

In the above equation M is a modulation ratio ranging from 0 to 1, and $\theta_{wc}$, which is a center phase position of the maximum window period, is given by TABLE 3 below.

TABLE 3

| θ (degrees) | $\theta_{wc}$ (degrees) |
|---|---|
| 0 ≤ θ <30 | 0 |
| 30 ≤ θ <90 | 60 |
| 90 ≤ θ <150 | 120 |
| 150 ≤ θ <210 | 180 |
| 210 ≤ θ <270 | 240 |
| 270 ≤ θ <330 | 300 |
| 330 ≤ θ <360 | 0 |

Figure 21:
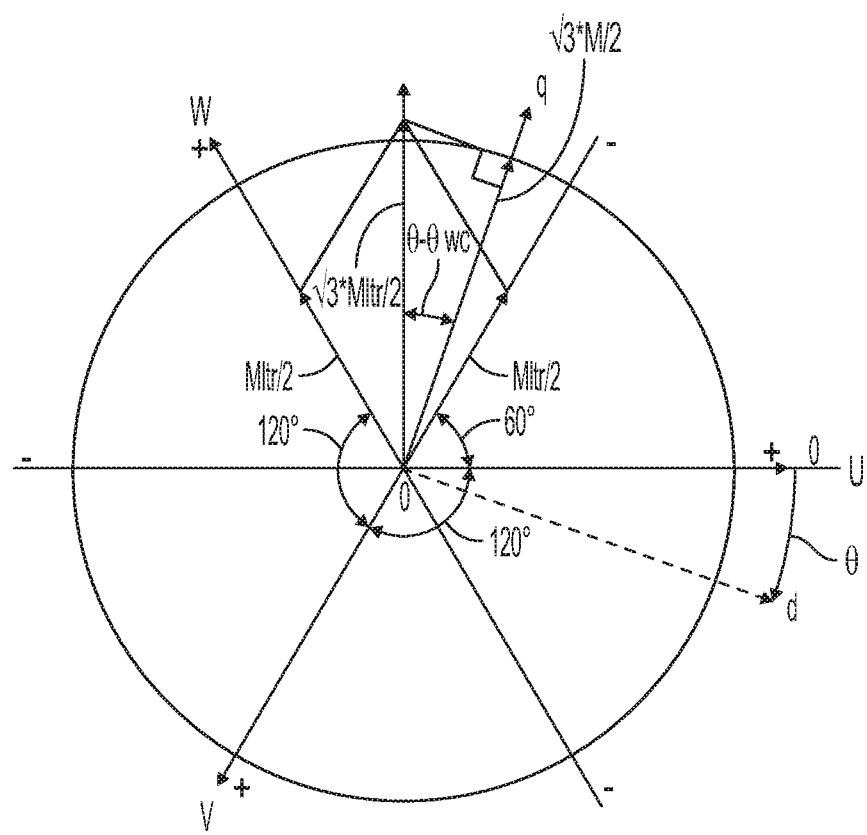
FIG. 21 is a diagram of a current vector in a method of driving a three-phase motor.

FIG. 21 shows a vector diagram of a current vector in LTR modulation. In this example, "d" represents the rotor's d-axis and "q" represents the rotor's q-axis. For this graph it is assumed that the motor's stator is configured by a star connection, that each phase resistance is 1 ohm, and that the rotor position is 0≤θ<30 or 330≤θ<360.

Figure 22:
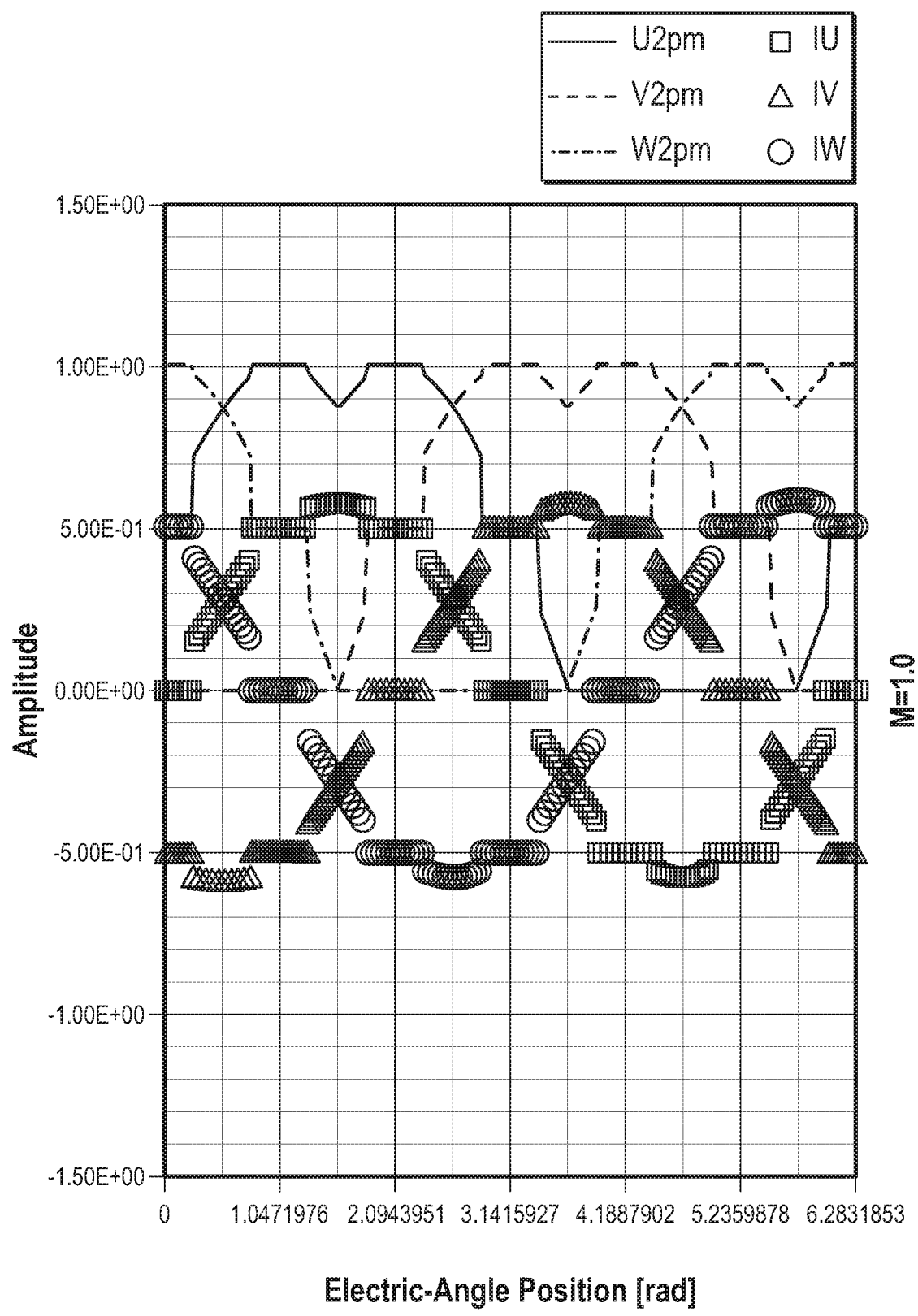
FIG. 22 is a graph of voltage and current amplitude plotted as a function of electric angle position of the rotor for an implementation of a method of driving a three-phase motor.

FIG. 22 shows a graph of voltage and current amplitude plotted as a function of electric angle position of the rotor for an implementation of a method of driving a three-phase motor that includes LTR modulation. This graph omits stator inductances and BEMF voltage for simplification. The drive phase voltages and drive phase currents are shown and, other than the plotted values, the characteristics/details of this graph are similar to those of FIG. 1. A modulation ratio of 1.0 is used in this drive method.

When a positive voltage is being applied to a phase and a WNDENG window is reached, the applied voltage to that phase switches temporarily from a sinusoidal waveform to an LTR waveform. The LTR waveform results in an increased drive voltage for at least part of the WNDENG period relative to the normal sinusoidal drive waveform. When the WNDENG window is ended, the applied voltage to the phase switches back to the normal sinusoidal waveform. The HiZ periods/windows for the phases are also seen in this graph.

Figure 23:
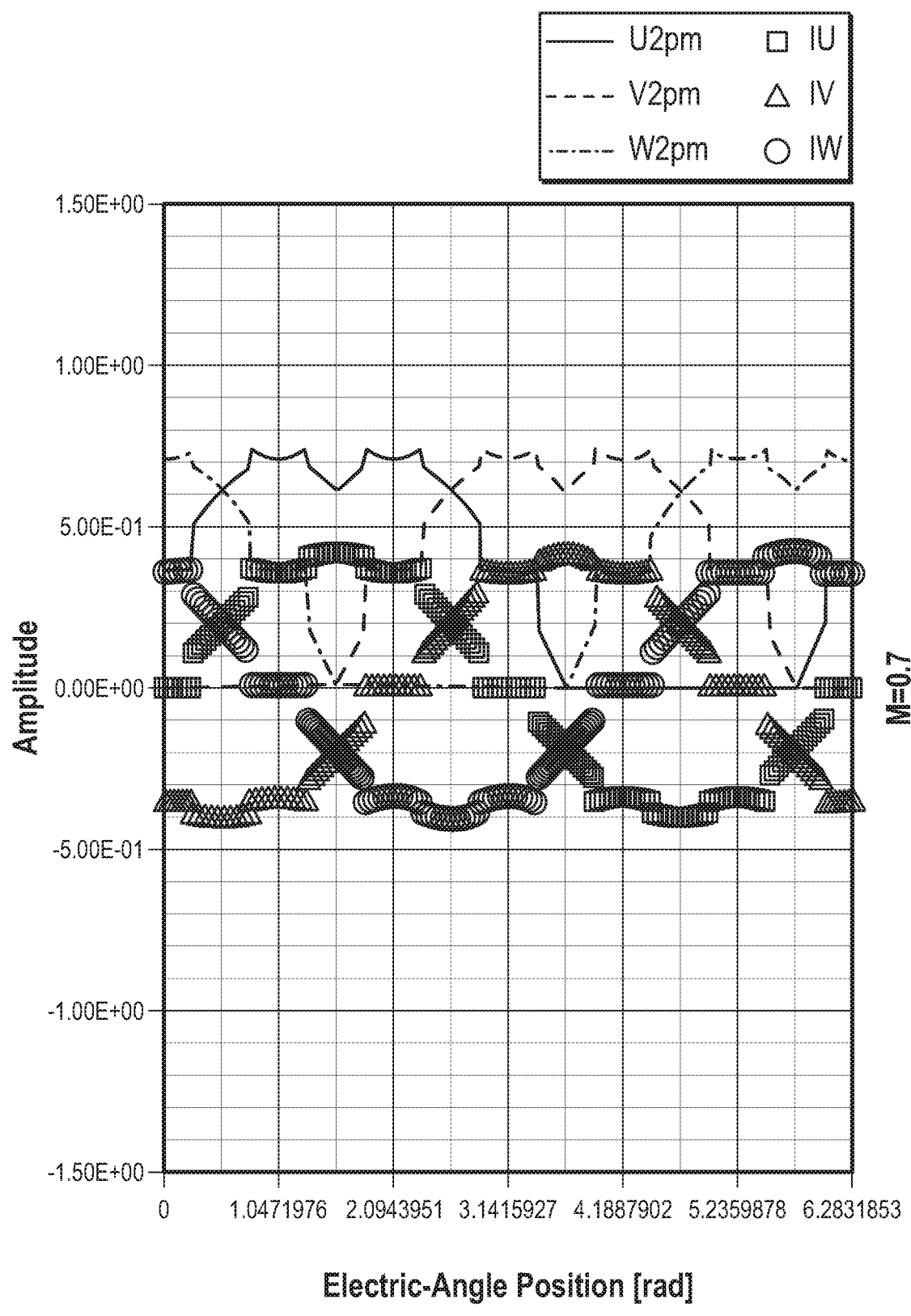
FIG. 23 is a graph of voltage and current amplitude plotted as a function of electric angle position of the rotor for an implementation of a method of driving a three-phase motor.

FIG. 23 shows a graph of voltage and current amplitude plotted as a function of electric angle position of the rotor for an implementation of a method of driving a three-phase motor that includes LTR modulation. This graph is similar to FIG. 22 except that a modulation ratio of 0.7 is used. This graph omits stator inductances and BEMF voltage for simplification. The drive phase voltages and drive phase currents are shown and, other than the plotted values, the characteristics/details of this graph are similar to those of FIG. 1. When a positive voltage is being applied to a phase and a WNDENG window is reached, the applied voltage to that phase switches temporarily from a sinusoidal waveform to an LTR waveform. The LTR waveform for the 0.7 modulation ratio is seen to be different than that for the 1.0 modulation ratio but, still, results in an increased drive voltage for at least part of the WNDENG period relative to the normal sinusoidal drive waveform. When the WNDENG window is ended, the applied voltage to the phase switches back to the normal sinusoidal waveform. The HiZ periods/windows for the phases are also seen in this graph.

In the examples of FIGS. 22-23 the electric angle positions and widths of the window periods are 0 degrees+/−15 degrees, 60 degrees+/−15 degrees, 120 degrees+/−15 degrees, 180 degrees+/−15 degrees, 240 degrees+/−15 degrees, and 300 degrees+/−15 degrees.

Figure 24:
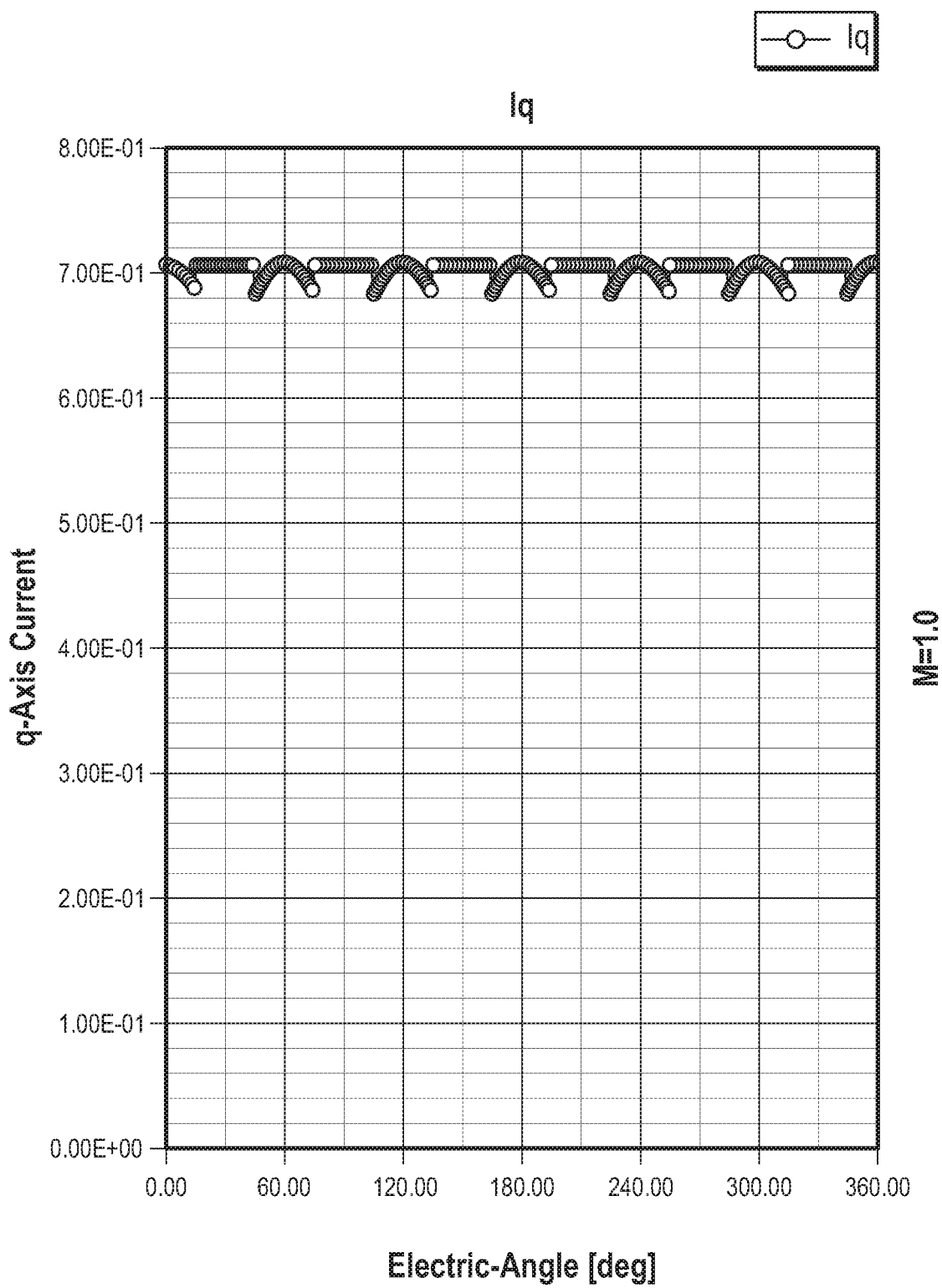
FIG. 24 is a graph of torque plotted as a function of electric angle position of the rotor for the method of FIG. 22.

FIG. 24 representatively illustrates the torque of the three phase motor of FIG. 22 plotted against the electric angle of the rotor of the motor (this time represented in degrees). The torque is represented by q-axis current converted by the Clarke-Park transformation, the q-axis current representing generated torque. The torque ripples are visually seen in FIG. 24, with the torque dipping low in several places, each of these dips corresponding with a HiZ window of one of the phases. The torque ripples are improved relative to the torque ripples of FIG. 4, but they are still present.

Figure 25:
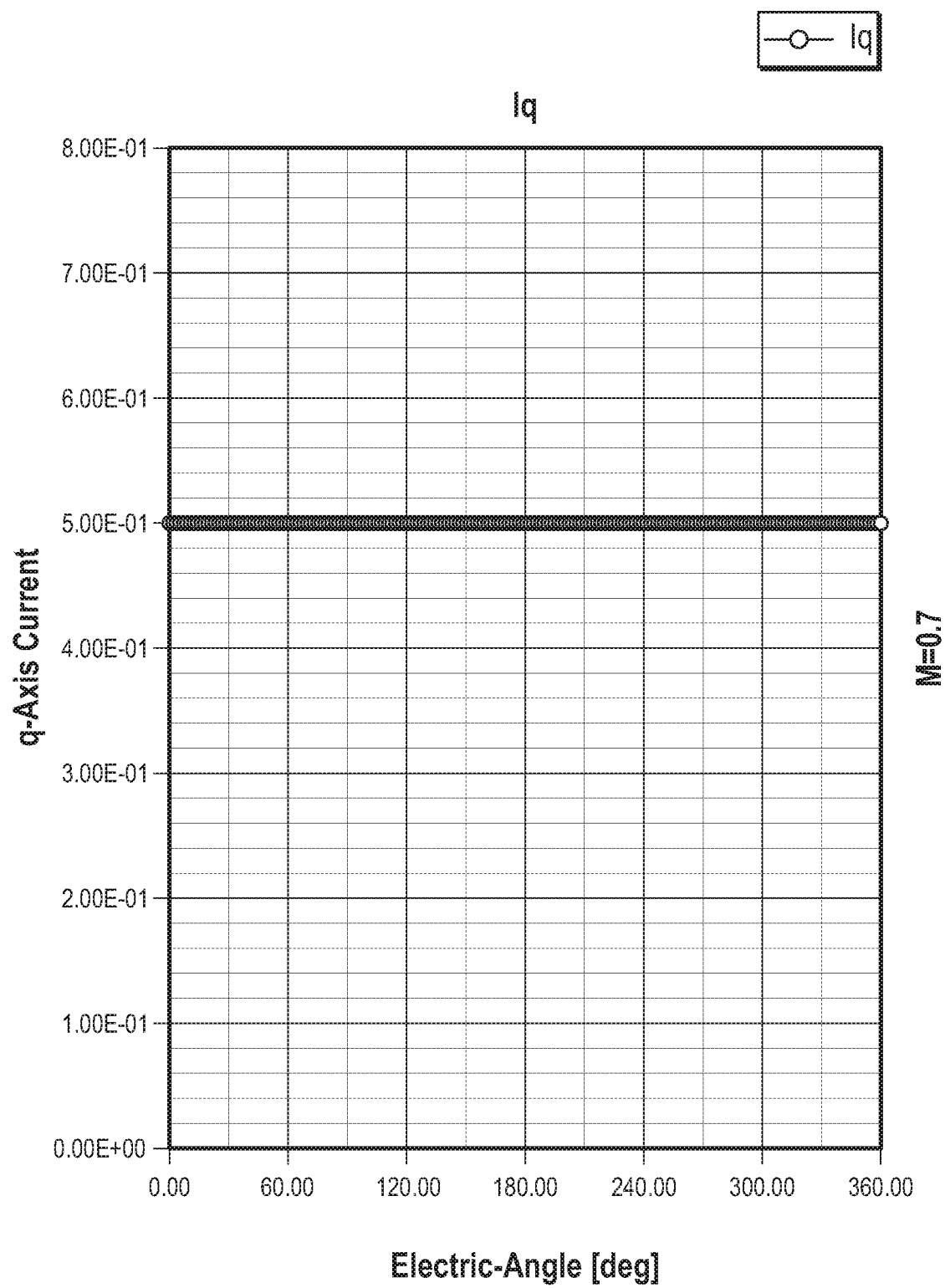
FIG. 25 is a graph of torque plotted as a function of electric angle position of the rotor for the method of FIG. 23 showing an absence of torque ripple.

FIG. 25 representatively illustrates the torque of the three phase motor of FIG. 23 plotted against the electric angle of the rotor of the motor (this time represented in degrees). The torque is represented by q-axis current converted by the Clarke-Park transformation, the q-axis current representing generated torque. In this graph the torque ripples are no longer seen. Accordingly, this graph is an example of a graph plotting a generated torque of the three-phase motor on a y-axis and a rotor angle position of a rotor of the three-phase motor on an x-axis that displays no variation in the generated torque over at least one powered 360-degree rotation of the rotor (single torque value over a powered 360 degree rotation). This shows that for the LTR modulation equations given above, when the modulation ratio M is 1, the torque ripple remains, but when the modulation ratio M is lowered to 0.7, the ripple is adequately decreased so that it does not appear on the graph of FIG. 25. It is possible that, in implementations, modulation ratios above 0.7 could also result in a decrease in torque ripple significant enough to present a graph similar to FIG. 25. It is also expected that modulation ratios below 0.7 would result in graphs similar to FIG. 25 showing no torque ripple.

The decrease in torque ripple may result in increased life of the motor, reduced wear and tear to the motor and its components, more silent operation, more efficient operation, and so forth. As a non-limiting example, in a fan motor application, a smaller modulation ratio would usually mean a lower speed operation for the motor and in this case it also results in lower torque ripple, which reduces the vibration and noise of the fan.

Figure 26:
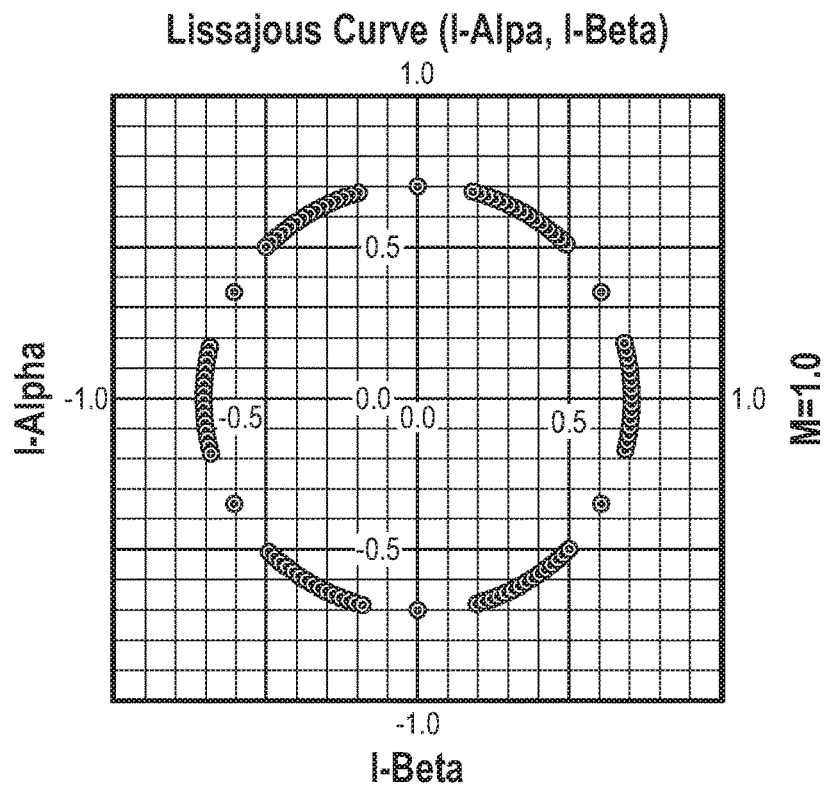
FIG. 26 is a graph of a Lissajous curve for the method of FIG. 22.
Figure 27:
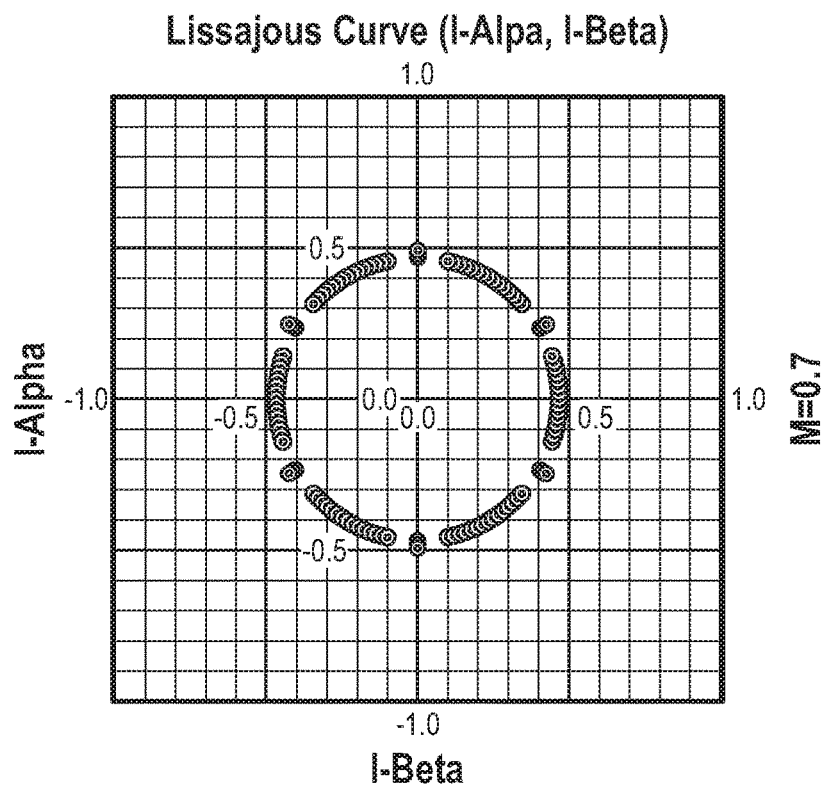
FIG. 27 is a graph of a Lissajous curve for the method of FIG. 23.

FIG. 26 shows a Lissajous curve of drive current converted by the Clarke transformation for the drive method of FIG. 22 with a 1.0 modulation ratio. The I-Alpha axis is the Alpha-axis current and the I-Beta axis is the Beta-axis current. The Lissajous curve shows where the torque is when the current is applied and the motor is applied. Where there are no circles on the curve this indicates the torque jumping from one value to another—these locations correspond with the torque ripples of FIG. 24. FIG. 27 shows a Lissajous curve of drive current converted by Clarke transformation for the drive method of FIG. 23 using a 0.7 modulation ratio. Other than the plotted values, the characteristics/details of the graph of FIG. 27 are similar to those of FIG. 26. Nevertheless, although there are locations where circles are not present, the torque ripples are not evident in the graph of FIG. 25. These Lissajous curves also show, when compared with the graphs of FIGS. 6 and 7, that the drive current values themselves are changed between the LTR-modulated and non-LTR-modulated versions.

Figure 28:
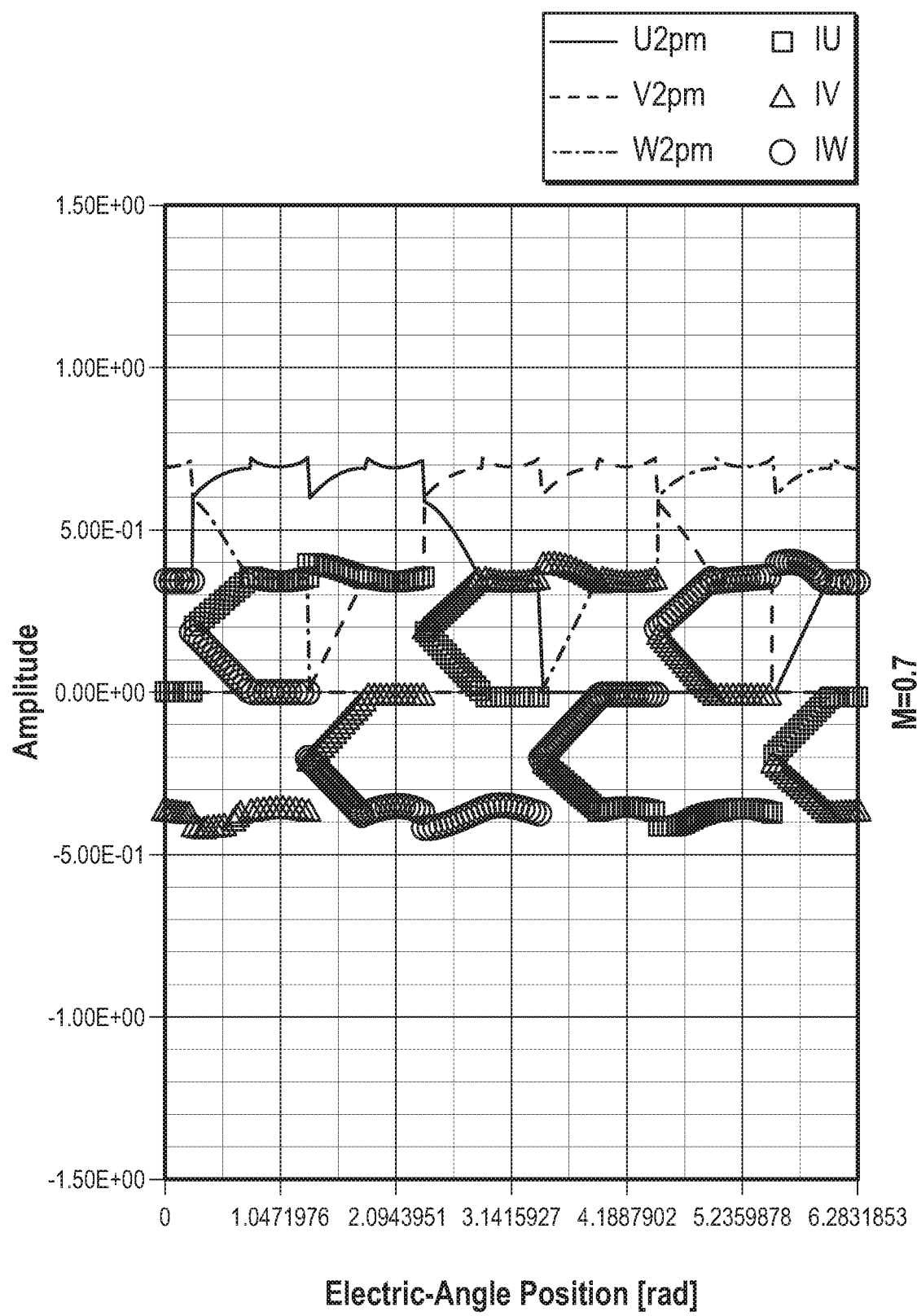
FIG. 28 is a graph of voltage and current amplitude plotted as a function of electric angle position of the rotor for an implementation of a method of driving a three-phase motor.

Lead angle control will now be discussed. Lead angle control adds offset into a phase position to generate a modified drive voltage waveform. As an example, when LTR modulation as described above is used and when a modulation ratio of 0.7 is used, then when the lead angle is 0 the generated drive voltage waveform would be given as indicated in FIG. 23. On the other hand, if the lead angle amount is changed to 15 degrees, the drive waveform is generated as shown in FIG. 28. Both FIGS. 23 and 28 are drawn assuming that 0 radians is the point of U phase rising above the BEMF zero-cross point.

Accordingly, when the lead angle is considered, the $U_{2pm}$, $V_{2pm}$ and $W_{2pm}$ equations above should be implemented considering the lead angle amount. But TABLES 2 and 3 and the $M_{ltr}$ equation above should be implemented by $\theta$ information not considering lead angle. This means that the $\theta$ information used to determine the basic 2-phase modulation waveform should include a lead angle amount, but the window period and LTR modulation should be operated by $\theta$ information not including lead angle amount.

Figure 29:
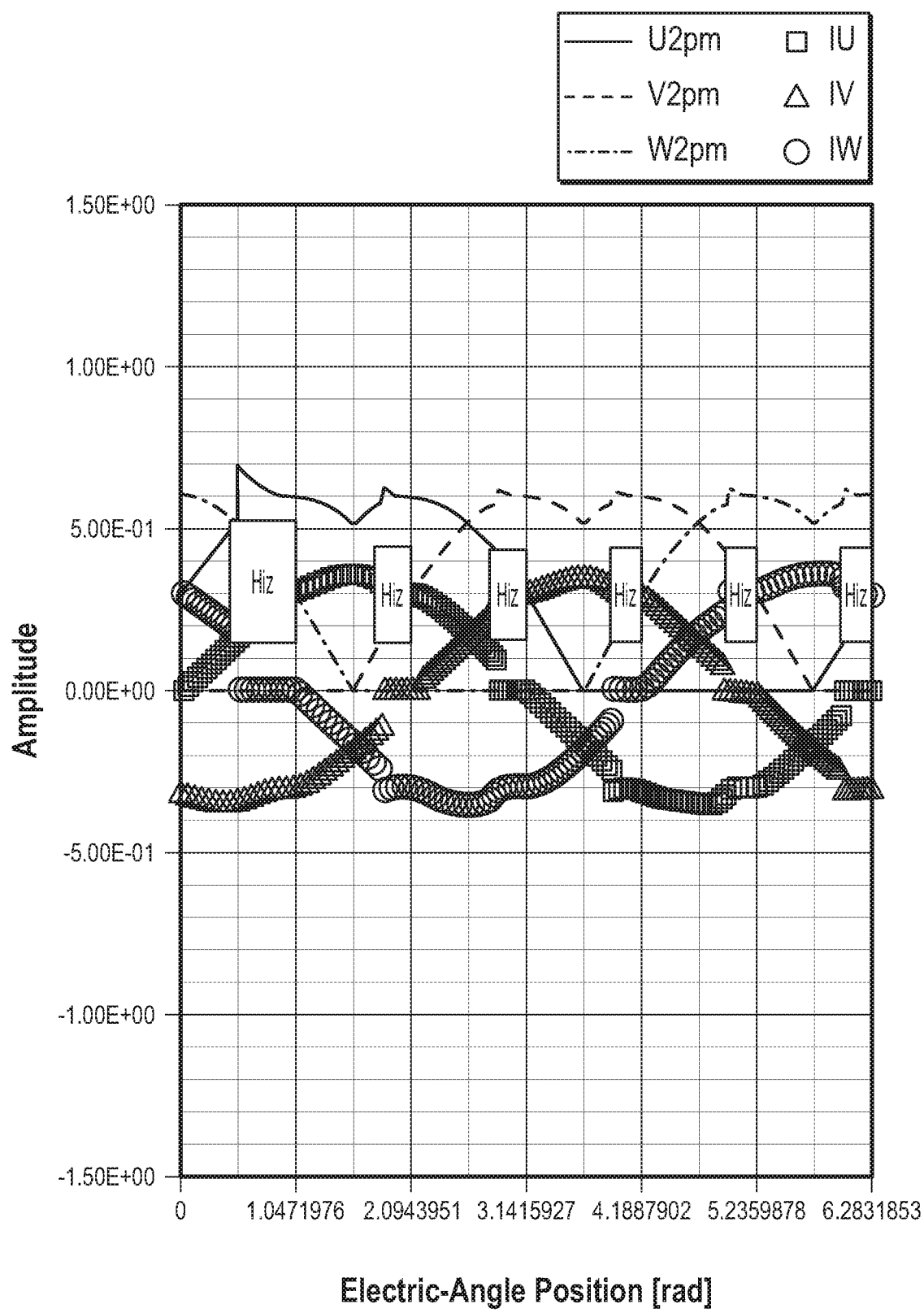
FIG. 29 is a graph of voltage and current amplitude plotted as a function of electric angle position of the rotor for an implementation of a method of driving a three-phase motor.

Referring now to FIG. 29, another example of a graph of voltage and current amplitude plotted as a function of electric angle position of the rotor for an implementation of a method of driving a three-phase motor (including LTR modulation) is shown. This method departs from the methods and equations disclosed above in that, as soon as BEMF is detected, the LTR modulated phase returns to the normal sinusoidal phase (ALLENG) instead of being driven by the LTR modulation for the entire WNDENG window. In implementations this increases efficiency and reduces torque ripple even further for reduced noise, improved life of the motor and reduced wear and tear, etc. The example in FIG. 29 uses a modulation ratio of 0.6 and the HiZ windows are shown. Apart from the plotted values, the characteristics/details of FIG. 29 are similar to those of FIG. 1. In another representative example a predetermined time could be selected, and the LTR modulation could be used to drive the phase voltage only until the predetermined time, the predetermined time being selected to be enough time to detect BEMF but still only a fraction less than the full WNDENG window.

In the implementation of FIG. 29 the electric angle positions and widths of the window periods are 0 degrees+0/−15 degrees, 60 degrees+0/−30 degrees, 120 degrees+0/−15 degrees, 180 degrees+0/−15 degrees, 240 degrees+0/−15 degrees, and 300 degrees+0/−15 degrees.

Figure 30:
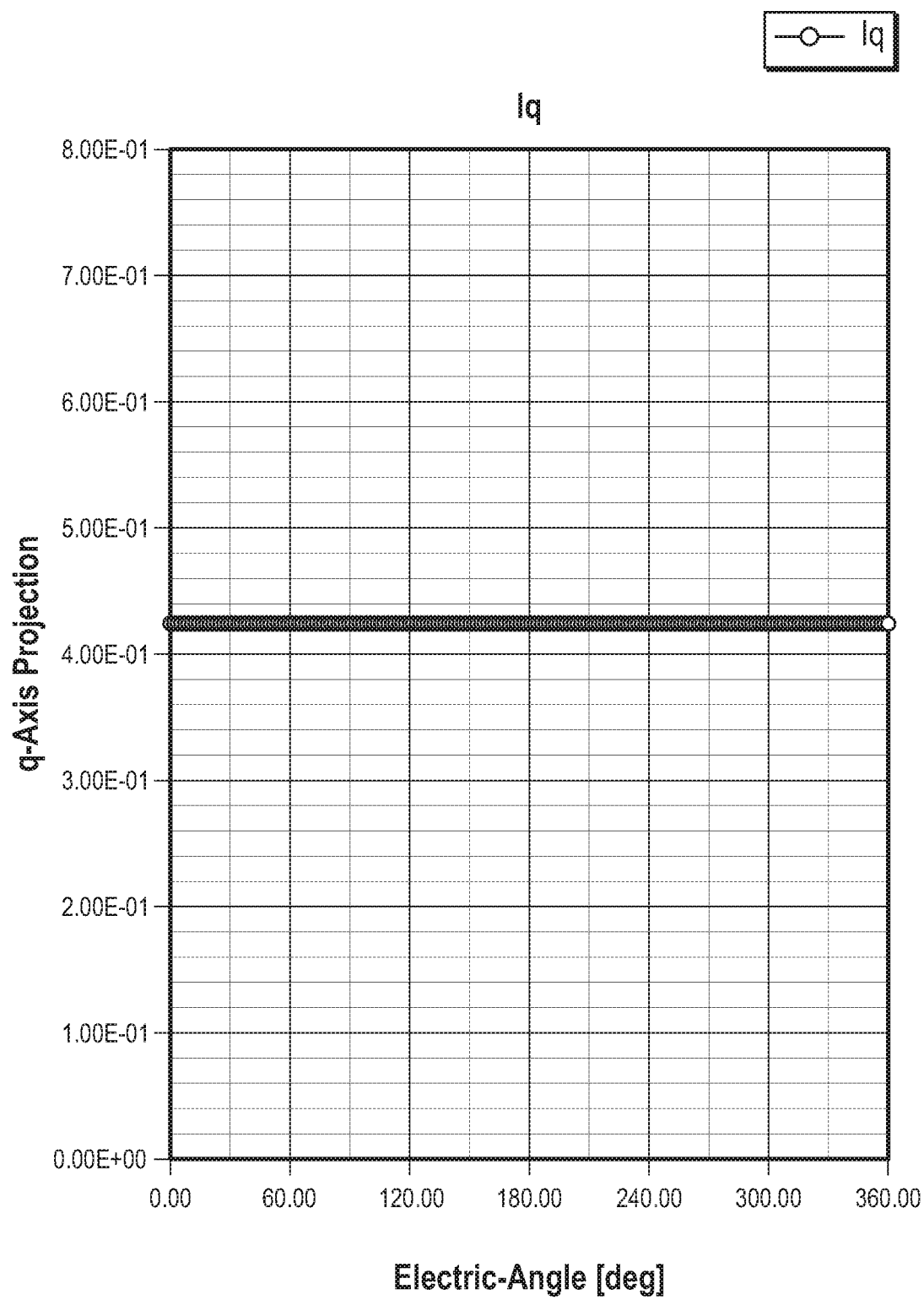
FIG. 30 is a graph of torque plotted as a function of electric angle position of the rotor for the method of FIG. 29 showing an absence of torque ripple.

FIG. 30 representatively illustrates the torque of the three phase motor of FIG. 29 plotted against the electric angle of the rotor of the motor (represented in degrees). The torque is represented by q-axis current converted by the Clarke-Park transformation, the q-axis current representing generated torque. In this graph the torque ripples are again not observed. Accordingly, this graph is another example of a graph plotting a generated torque of the three-phase motor on a y-axis and a rotor angle position of a rotor of the three-phase motor on an x-axis that displays no variation in the generated torque over at least one powered 360-degree rotation of the rotor.

Figure 31:
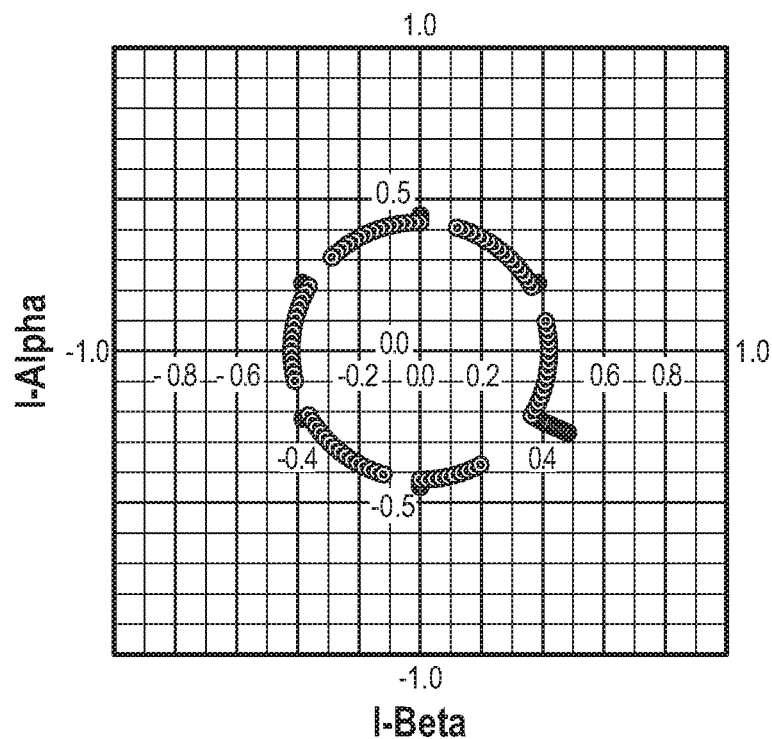
FIG. 31 is a graph of a Lissajous curve for the method of FIG. 29.

FIG. 31 shows a Lissajous curve of drive current converted by the Clarke transformation for the drive method of FIG. 29. Other than the plotted values, the characteristics/details of the graph of FIG. 31 are similar to those of FIG. 27. Nevertheless, although there are locations where circles are not present, the torque ripples are not evident in the graph of FIG. 30. This Lissajous curve also shows, when compared with the graph of FIG. 7, that the drive current values are changed between the LTR modulated and non-LTR-modulated versions.

Referring now to FIG. 32, an example of a three-phase inverter circuit that may be used in or with a control module to control a three-phase motor, according to the methods disclosed herein, is shown. The three-phase inverter circuit uses three half bridges to drive the motor. As an example of driving just the U phase, when drive voltage is applied to the U phase the UH is pulsed on and off using PWM. When UH is on UL is off and vice-versa. When the drive voltage for the U phase is zero then UL stays on and UH stays off.

Figure 33:
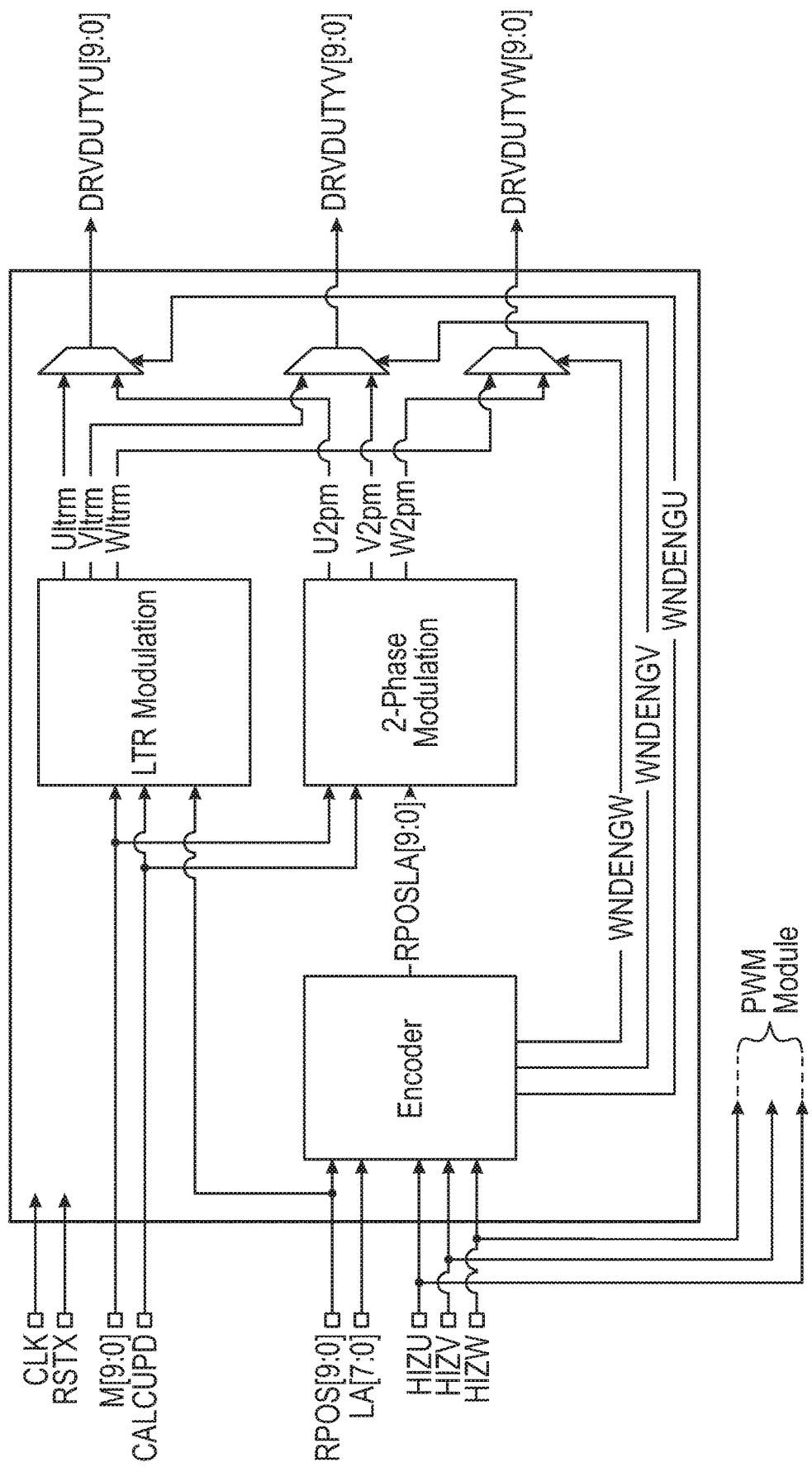
FIG. 33 is a block diagram representatively illustrating a controller used to control a three-phase motor.

Referring now to FIG. 33, a block diagram representatively illustrates a controller (which in particular implementations may be implemented in an integrated circuit) for controlling a three phase motor using the methods disclosed herein. Various elements are shown including an encoder module/component, an LTR (low torque ripple) Modulation module/component, a 2-Phase Modulation module/component, and so forth. A pulse width modulation (PWM) module is not shown but electric connections to be coupled with a PWM module are representatively illustrated.

The inputs of the controller of FIG. 33 include the following: CLK (operation clock); RSTX (reset—0 is reset and 1 is active); RPOS[9:0] (rotor's position information—$\theta$) (rotor position information is based on detected BEMF zero-cross signal, 0.352deg/LSB); LA[7:0] (lead angle amount/value—$\theta_{la}$) (0.352deg/LSB); M[9:0] (output modulation ratio—M, full scale is 100%, 0 is 0%); HIZU (non-exciting window period status flag of U-phase, 1: window period, 0: normal); HIZV (non-exciting window period status flag of V-phase, 1: window period, 0: normal); HIZW (non-exciting window period status flag of W-phase, 1: window period, 0: normal); CALCUPD (update event flag for calculating next value—when this flag has risen, the next value is updated by input values of that moment).

The outputs of the controller of FIG. 33 include the following: DRVDUTYU[9:0] (drive PWM duty ratio, U-phase, full scale is 100%, 0 is 0%); DRVDUTYV[9:0] (drive PWM duty ratio, V-phase, full scale is 100%, 0 is 0%); DRVDUTYW[9:0] (drive PWM duty ratio, W-phase, full scale is 100%, 0 is 0%).

It is also pointed out that RPOSLA=RPOS+LA. WNDENGU, WNDENGV and WNDENGW correspond to WNDENG windows for U, V, and W phases, respectively. HIZU, HIZV and HIZW are provided from an external module. The complete N-window drive waveform including a non-exciting phase is finished using a PWM module, not illustrated in FIG. 33 but coupled with the controller.

Figure 34:
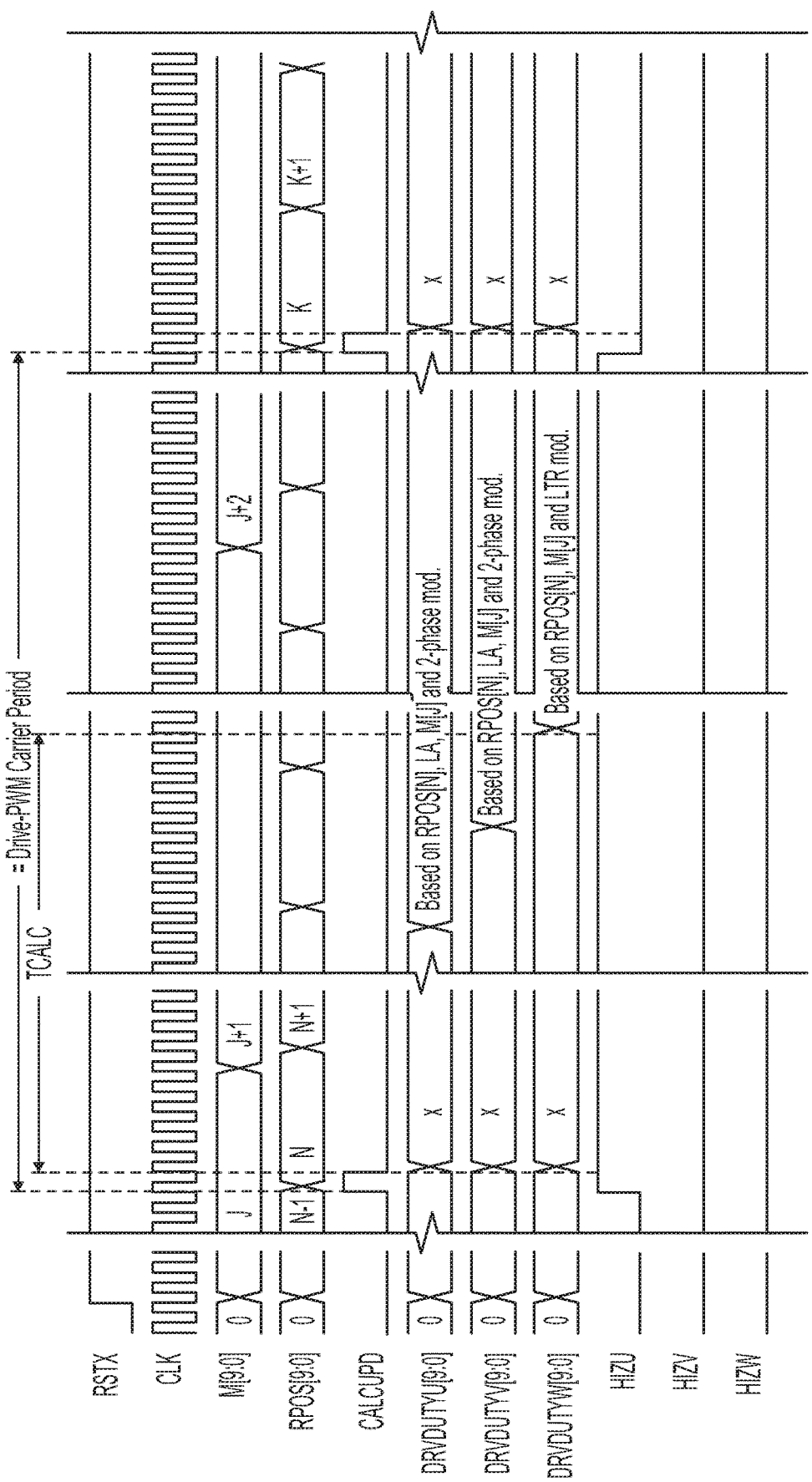
FIG. 34 is a timing chart for a method of controlling a three-phase motor.
Figure 35:
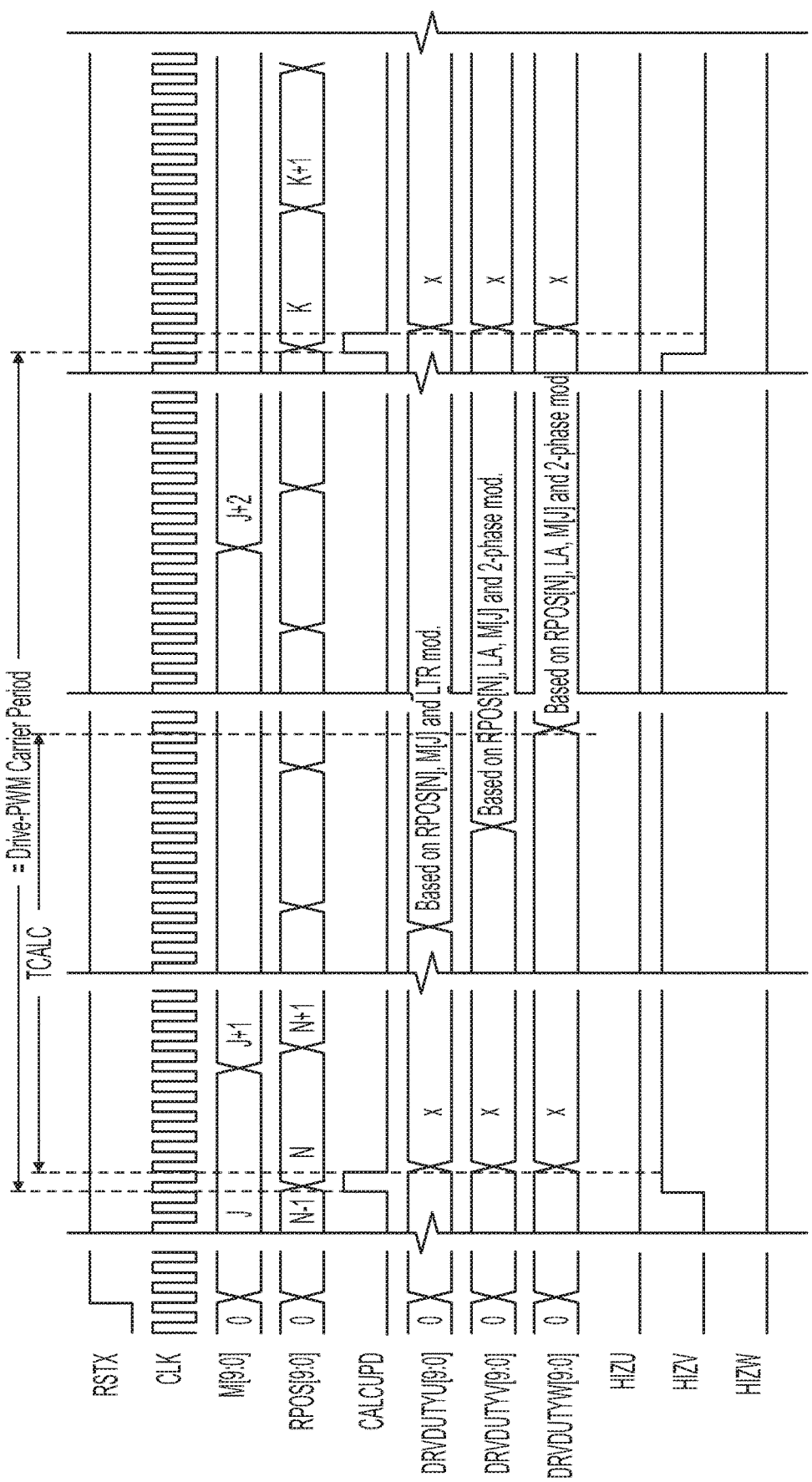
FIG. 35 is a timing chart for a method of controlling a three-phase motor.
Figure 36:
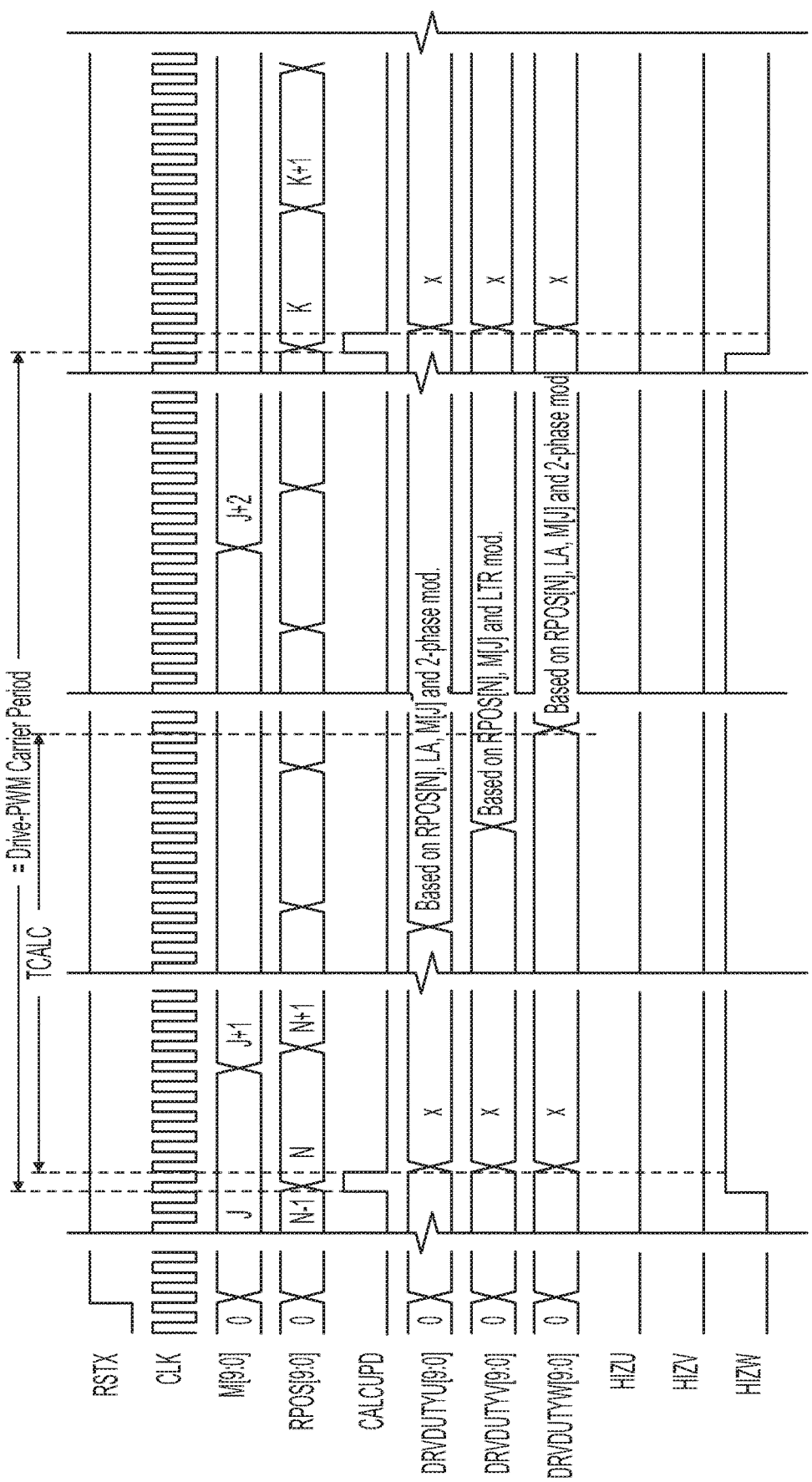
FIG. 36 is a timing chart for a method of controlling a three-phase motor.

Referring now to FIGS. 34-36, a number of timing charts are given. Calculation for these timing function must be completed within one drive-PWM period. TCALC shown in FIGS. 34-36 represents calculation time, and should be determined according to actual design. The period of CALCUPD should be matched with the drive-PWM carrier period, but the assertion timing should be designed optimally within the PWM carrier period to minimize system delay with respect to RPOS and LA information. This means that TCALC is important to optimize the design to ensure that the timing is set up to correspond with the drive-PWM carrier period.

FIG. 34 is an example of a timing chart in a case where HIZU=1 and $0 \le \theta < 30$ or $330 \le \theta < 360$. In the case of $150 \le \theta < 210$, as long as DRVDUTYV output is alternated with LTR modulation and DRVDUTYW output is alternated with 2-phase modulation, the timing is similar to FIG. 34.

FIG. 35 is an example of a timing chart in a case where HIZV=1 and $90 \le \theta < 150$. In the case of $270 \le \theta < 330$, as long as DRVDUTYW output is alternated with LTR modulation and DRVDUTYU output is alternated with 2-phase modulation, the timing is similar to FIG. 35.

FIG. 36 is an example of a timing chart in a case where HIZW=1 and $210 \le \theta < 270$. In the case of $30 \le \theta < 90$, as long as DRVDUTYU output is alternated with LTR modulation and DRVDUTYV output is alternated with 2-phase modulation, the timing is similar to FIG. 36.

Figure 37:
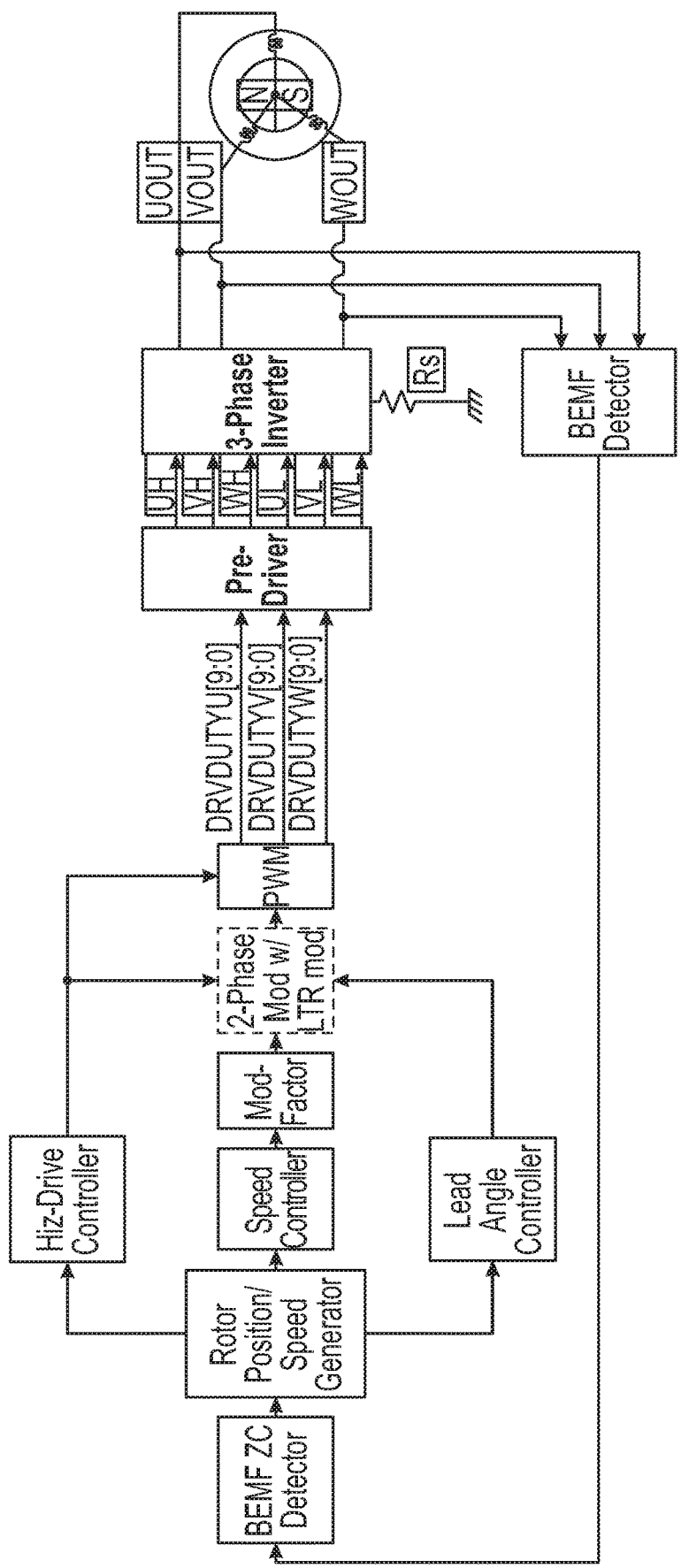
FIG. 37 is a block diagram representatively illustrating a three-phase motor and elements used to control the three-phase motor and detect BEMF signals.

FIG. 37 is a block diagram representatively illustrating a three-phase motor and elements used to control the three-phase motor and detect BEMF signals. In this representative example, the three-phase inverter and BEMF detector are separate individual modules, while everything to the left of these is implemented on a single semiconductor device. In this example the LTR modulation methods disclosed herein are implemented using the "2-Phase Mod w/LTR mod" block. The configuration of FIG. 37 applies only to star-configuration three-phase motors.

In implementations modulation ratios disclosed herein may be determined by system capacity, wherein a modulation ratio of 1.0 is full system capacity (of applied voltage) and lower modulation ratios are a corresponding percentage of full system capacity.

It is pointed out that TABLE 2 includes values only for a 6-window mode. However, the $U_{2pm}$, $V_{2pm}$, $W_{2pm}$ equations are given priority over TABLE 2. When 1-window, 2-window or 3-window modes are used, the ALLENG period increases over a 6-window ALLENG period, and WNDENG period and window periods decrease. Because of this, LTR modulation can be defined based on the TABLE 2 values even though they technically only represent 6-window mode.

It is further pointed out that the start timing of a non-energized portion can be decided on according to the respective application, and the end time of the non-energized portion can be decided adaptively (or using a predetermined time). When the start timing is far from BEMF zero-cross the robustness for detection will increase but the torque ripple will not be reduced as much.

In places where the description above refers to particular implementations of drive methods for three phase motors and implementing components, sub-components, methods and sub-methods, it should be readily apparent that a number of modifications may be made without departing from the spirit thereof and that these implementations, implementing components, sub-components, methods and sub-methods may be applied to other drive methods for three phase motors.

What is claimed is:

1. A method of driving a star-connected three-phase motor, comprising:
while a first phase of the star-connected three-phase motor is in an energized state, driving a second phase of the three-phase motor using a first sinusoidal drive function;
switching the first phase to a non-energized state;

while the first phase is in the non-energized state, detecting a first back electromotive force (BEMF) voltage of the first phase; and for at least a portion of a time when the first phase is in the non-energized state, driving the second phase using a second drive function that varies from the first sinusoidal drive function to generate torque with no variation in the torque over a powered 360 degree rotation of the three-phase motor.

2. The method of claim 1, wherein the three-phase motor comprises one of a sensorless brushless direct current (BLDC) motor and a permanent magnet synchronous motor (PMSM).

3. The method of claim 1, wherein driving the second phase using the second drive function results in an increased voltage applied to the second phase relative to driving the second phase using the first sinusoidal drive function.

4. The method of claim 1, further comprising, while the first phase is in a second non-energized state, driving a third phase of the three-phase motor using a third drive function that varies from a second sinusoidal drive function.

5. The method of claim 4, wherein driving the third phase using the third drive function results in an increased voltage applied to the third phase relative to driving the third phase using the second sinusoidal drive function.

6. The method of claim 1, further comprising, after driving the second phase using the second drive function until the first BEMF voltage is detected, driving the second phase using the first sinusoidal drive function.

7. The method of claim 1, further comprising, after driving the second phase using the second drive function for a predetermined amount of time, driving the second phase using the first sinusoidal drive function.

* * * * *